US012231297B2

(12) United States Patent
Bertizzolo et al.

(10) Patent No.: US 12,231,297 B2
(45) Date of Patent: Feb. 18, 2025

(54) DISTRIBUTED DEEP REINFORCEMENT LEARNING FRAMEWORK FOR SOFTWARE-DEFINED UNMANNED AERIAL VEHICLE NETWORK CONTROL

(71) Applicant: Northeastern University, Boston, MA (US)

(72) Inventors: Lorenzo Bertizzolo, Boston, MA (US); Tommaso Melodia, Newton, MA (US); Salvatore D'Oro, Allston, MA (US); Hai Cheng, Boston, MA (US)

(73) Assignee: Northeastern University, Boston, MA (US)

( * ) Notice: Subject to any disclaimer, the term of this patent is extended or adjusted under 35 U.S.C. 154(b) by 226 days.

(21) Appl. No.: 17/846,197

(22) Filed: Jun. 22, 2022

(65) Prior Publication Data

US 2024/0205095 A1 Jun. 20, 2024

Related U.S. Application Data

(60) Provisional application No. 63/215,693, filed on Jun. 28, 2021.

(51) Int. Cl.
*H04L 41/122* (2022.01)
*H04W 84/06* (2009.01)

(52) U.S. Cl.
CPC ........... *H04L 41/122* (2022.05); *H04W 84/06* (2013.01)

(58) Field of Classification Search
CPC .............................. H04L 41/122; H04W 84/06
USPC ......................................................... 370/321
See application file for complete search history.

(56) References Cited

U.S. PATENT DOCUMENTS

| | | | | |
|---|---|---|---|---|
| 2006/0234714 A1* | 10/2006 | Pollini | ................... | H04W 16/06 455/446 |
| 2013/0124712 A1* | 5/2013 | Parker | ..................... | H04L 43/55 709/224 |
| 2013/0303218 A1* | 11/2013 | Teller | .................... | H04W 16/04 455/507 |
| 2014/0195849 A1* | 7/2014 | Parladori | ............ | G06F 11/3051 714/15 |
| 2015/0063159 A1* | 3/2015 | Bonawitz | ........... | H04B 7/18504 370/254 |

(Continued)

OTHER PUBLICATIONS

Bertizzolo et al., "SwarmControl: An Automated Distributed Control Framework for Self-Optimizing Drone Networks", IEEE InfoCom 2020-IEEE Conference on Computer Communications. IEEE, 2020, pp. 1768-1777.

(Continued)

*Primary Examiner* — Mark G. Pannell
(74) *Attorney, Agent, or Firm* — Verrill Dana, LLP

(57) ABSTRACT

Provided herein are systems for controlling a network of distributed non-terrestrial nodes including a control framework operative to train and control a plurality of the non-terrestrial nodes, the control framework including a control interface in communication with a network operator to receive one or more specified control objectives, and a learning engine operative to train a virtual non-terrestrial network, wherein the control framework is further operative to transfer knowledge gained through the training of the virtual non-terrestrial network to the network of distributed non-terrestrial nodes as data-driven logic unit configurations tailored for the specified control objectives.

23 Claims, 18 Drawing Sheets

(56) References Cited

U.S. PATENT DOCUMENTS

| | | | | |
|---|---|---|---|---|
| 2015/0289149 | A1* | 10/2015 | Ouyang | H04W 16/18 370/252 |
| 2015/0330869 | A1* | 11/2015 | Ziarno | G01M 15/14 701/34.4 |
| 2016/0005159 | A1* | 1/2016 | Hallamask | B64U 10/60 701/300 |
| 2016/0034823 | A1* | 2/2016 | Farkas | H04W 16/22 706/14 |
| 2016/0330771 | A1* | 11/2016 | Tan | H04B 7/18506 |
| 2016/0371987 | A1* | 12/2016 | Kotecha | G05D 1/0022 |
| 2017/0178518 | A1* | 6/2017 | Foladare | G08G 5/0034 |
| 2017/0187993 | A1* | 6/2017 | Martch | G01S 1/00 |
| 2017/0316701 | A1* | 11/2017 | Gil | B60P 3/11 |
| 2018/0156616 | A1* | 6/2018 | Bennett | G01S 19/42 |
| 2018/0284757 | A1* | 10/2018 | Cella | G05B 23/0294 |
| 2018/0357909 | A1* | 12/2018 | Eyhorn | G08G 5/0069 |
| 2018/0376390 | A1* | 12/2018 | Gemelos | H04W 36/0016 |
| 2019/0044802 | A1* | 2/2019 | Gibbon | H04L 41/40 |
| 2020/0252122 | A1* | 8/2020 | Tofighbakhsh | H04B 7/18506 |
| 2020/0252941 | A1* | 8/2020 | Schmidt | H04W 72/541 |
| 2020/0255026 | A1* | 8/2020 | Katardjiev | G08G 1/096741 |
| 2020/0346751 | A1* | 11/2020 | Horelik | B64U 10/13 |
| 2021/0099378 | A1* | 4/2021 | Alaettinoglu | H04L 45/70 |
| 2021/0159970 | A1* | 5/2021 | Hong | B60L 53/66 |
| 2021/0191390 | A1* | 6/2021 | Hwang | B64U 30/20 |
| 2021/0266781 | A1* | 8/2021 | Alkurd | H04L 41/0823 |
| 2021/0329668 | A1* | 10/2021 | Singh Shekhawat | G06N 3/006 |
| 2022/0006726 | A1* | 1/2022 | Michael | H04L 45/24 |
| 2022/0007310 | A1* | 1/2022 | Najla | H04W 52/383 |
| 2022/0014449 | A1* | 1/2022 | Mwanje | H04L 41/145 |
| 2022/0124574 | A1* | 4/2022 | Veggalam | H04W 24/02 |
| 2022/0303787 | A1* | 9/2022 | Pratt | H04W 64/00 |
| 2022/0303881 | A1* | 9/2022 | Menon | H04W 28/0858 |
| 2022/0345203 | A1* | 10/2022 | Vrind | H04W 24/02 |
| 2023/0262683 | A1* | 8/2023 | Saxena | H04W 72/54 370/329 |

OTHER PUBLICATIONS

Bertizzolo et al., "Streaming from the Air: Enabling Drone-sourced Video Streaming Applications on 5G Open-RAN Architectures", arXiv preprint arXiv:2101.08681, 2021, 13 pages.

Ferranti et al., "Hiro-net: Self-organized robotic mesh networking for internet sharing in disaster scenarios," in 2019 IEEE 20th International Symposium on" A World of Wireless, Mobile and Multimedia Networks"(WoWMoM). IEEE, 2019, pp. 1-9.

Sheshadri et al., "SkyHaul: An Autonomous Gigabit Network Fabric in the Sky," arXiv preprint arXiv:2006.11307, 2020, 15 pages.

Bertizzolo et al., "mmBAC: Location-aided mmWave backhaul management for UAV-based aerial cells," in Proceedings of the 3rd ACM Workshop on Millimeter-wave Networks and Sensing Systems, 2019, 6 pages.

Polese et al., "An Experimental mmWave Channel Model for UAV-to-UAV Communications," in Proceedings of the 4th ACM Workshop on Millimeter-Wave Networks and Sensing Systems, 2020, 7 pages.

Bertizzolo et al., "Live and let live: flying UAVs without affecting terrestrial UEs," in Proceedings of the 21st International Workshop on Mobile Computing Systems and Applications, 2020, pp. 21-26.

Ferranti et al., "Skycell: A prototyping platform for 5g aerial base stations," in 2020 IEEE 21st International Symposium on" A World of Wireless, Mobile and Multimedia Net-works"(WoWMoM). IEEE, 2020, pp. 329-334.

Abolhasan et al., "Software-defined wireless networking: centralized, distributed, or hybrid?" IEEE Network, vol. 29, No. 4, 2015, 9 pages.

Guan et al., "WNOS: An optimization-based wireless network operating system," in Proc. of ACM International Symposium on Mobile Ad Hoc Networking and Computing (MobiHoc), Los Angeles, CA, USA, 2018, 10 pages.

Bonati et al., "Cellos: Zero-touch softwarized open cellular networks," Computer Networks, vol. 180, p. 107380, 2020, 13 pages.

Jagannath et al., "Machine learning for wireless communications in the internet of things A comprehensive survey," Ad Hoc Networks, vol. 93, p. 101913, 2019, 46 pages.

Hernandez-Leal et al., "A survey and critique of multiagent deep reinforcement learning," Autonomous Agents and Multi-Agent Systems, vol. 33, No. 6, 49 p. 2019.

Wang et al., "Taking drones to the next level: Cooperative distributed unmanned-aerial-vehicular networks for small and mini drones," IEEE Vehicular Technology Magazine, vol. 12, No. 3, pp. 73-82, 2017.

Guillen-Perez et al., "Wifi networks on drones," in 2016 ITU Kaleido-scope: ICTs for a Sustainable World (Itu Wt), 2016, 8 pages.

Guan et al., "Distributed joint power, association and flight control for massive-mimo self-organizing flying drones," IEEE/ACM Transactions on Networking, vol. 28, No. 4, pp. 1491-1505, 2020.

Shaikh et al., "Robust multi-path communications for uavs in the urban iot," in 2018 IEEE International Conference on Sensing, Communication and Networking (SECON Workshops). IEEE, 2018, 5 pages.

Liu et al., "Trajectory Design and Power Control for Multi-UAV Assisted Wireless Networks: A Machine Learning Approach," IEEE Transactions on Vehicular Technology, vol. 68, No. 8, 13 p. 2019.

Challita et al., "Machine learning for wireless connectivity and security of cellular-connected uavs," IEEE Wireless Communications, vol. 26, No. 1, 8 p. 2019.

Chen et al., "Liquid State Machine Learning for Resource Allocation in a Network of Cache-Enabled LTE-U UAVs," in GLOBECOM 2017 - 2017 IEEE Global Communications Conference, 2017, 6 pages.

Kato et al., "Optimizing Space-Air-Ground Integrated Networks by Artificial Intelligence," IEEE Wireless Communications, vol. xx, No. xx, 7 p., 2018.

Qiu et al., "Placement optimization of aerial base stations with deep reinforcement learning," in IEEE International Conference on Communications (Icc). IEEE, 2020, 6 pages.

Saxena et al., "Optimal uav base station tra-jectories using flow-level models for reinforcement learning," IEEE Transactions on Cognitive Communications and Networking, vol. 5, No. 4, 13 p. 2019.

Bayerlein et al., "Trajectory Optimization for Autonomous Flying Base Station via Reinforcement Learning," in 2018 IEEE 19th International Workshop on Signal Processing Advances in Wireless Communications (SPAWC), 2018, 5 pages.

Klaine et al., "Distributed Drone Base Station Positioning for Emergency Cellular Networks Using Reinforcement Learning," Cognitive Computation, vol. 10, 10 2018, 15 pages.

Athukoralage et al., "Regret Based Learning for UAV Assisted LTE-U/WiFi Public Safety Networks," in IEEE Global Communications Conference (GLOBECOM), 2016, pp. 1-7.

Burhanuddin et al., "QoE Optimization for Live Video Streaming in UAV-to-UAV Communications via Deep Reinforcement Learning", IEEE Transactions on Vehicular Technology, vol. 71, No. 5, pp. 5358-5370, May 2022, doi: 10.1109/TVT.2022.3152146; 10 pages.

Tang et al., "Minimum Throughput Maximization for Multi-UAV Enabled Wpcn: A Deep Reinforcement Learning Method", IEEE Access, vol. 8, pp. 9124-9132, 2020.

Zhao et al., "Multi-Agent Deep Reinforcement Learning for Trajectory Design and Power Allocation in Multi-UAV Networks", IEEE Access, vol. 8, pp. 139670-139679, 2020.

Moorthy et al., "Letera: Stochastic beam control through esn learning in terahertz-band wireless uav networks," in IEEE Info-Com 2020-IEEE Conference on Computer Communications Workshops (Infocom Wkshps). IEEE, 2020, pp. 1039-1044.

Challita et al., "Interference Management for Cellular-Connected UAVs: A Deep Reinforcement Learning Approach", IEEE Transactions on Wireless Communications, vol. 18, No. 4, pp. 2125-2140, 2019.

(56) References Cited

OTHER PUBLICATIONS

Wu et al., "Energy efficient for UAV-enabled mobile edge computing networks: Intelligent task prediction and offloading," Computer Communications, vol. 150, pp. 556-562, 2020.

* cited by examiner

DISTRIBUTED DEEP REINFORCEMENT LEARNING FRAMEWORK FOR SOFTWARE-DEFINED UNMANNED AERIAL VEHICLE NETWORK CONTROL

CROSS REFERENCE TO RELATED APPLICATIONS

This application claims benefit under 35 U.S.C. § 119(e) of U.S. Provisional Application No. 63/215,693, filed on 28 Jun. 2021, entitled "Distributed Deep Reinforcement Learning Framework for Software-Defined Unmanned Aerial Vehicle Network Control," the entirety of which is incorporated by reference herein.

STATEMENT REGARDING FEDERALLY SPONSORED RESEARCH OR DEVELOPMENT

This invention was made with government support under Grant Number FA8750-18-C-0122 awarded by the Air Force Research Laboratory (AFRL). The government has certain rights in the invention.

BACKGROUND

Unmanned Aerial Vehicle (UAV) networks are attracting the interest of the wireless community as a 'tool' to provide flexible and on-demand network infrastructure. There are numerous applications for networked UAVs, including providing airborne emergency infrastructure in disaster scenarios, and off-the-grid, on-demand network provisioning in civilian and military scenarios.

SUMMARY

The technology described herein provides an architectural framework to support control messaging necessary to control and optimize a non-terrestrial wireless network based on Artificial Intelligence algorithms. The technology provides a two-tier architecture, including a central framework and a distributed framework. The former is installed at the core of the network infrastructure, for example, in a cloud server; the latter, instead, is installed at the edge nodes of the network infrastructure, that is, at the non-terrestrial wireless nodes such as UAVs and in-orbit nodes.

The central framework interfaces a Network Operator, which can specify a desired control objective the distributed wireless network should implement. The control framework instantiates a virtual non-terrestrial network in an emulation environment and trains such virtual network with artificial intelligence algorithms. When the training terminates, the knowledge gained in this virtual environment gets transferred to the real wireless nodes in the form of neural networks that are tailored for the specified control objective.

The distributed framework, installed at every wireless node, is in charge of implementing the data-handling operations and optimizing the wireless and motion (if available) capabilities on board. To optimize the wireless and motion operations of the wireless node, each node executes the received neural network on board. Specifically, the neural networks are executed based on fresh network state information available on board. Additionally, the edge wireless nodes collaborate with each other by exchanging local information to facilitate the neural networks execution.

The technology provides a number of features, aspects, and advantages, including an architectural solution for non-terrestrial wireless networks, a two-tier architecture with one control framework at the core of the network and a distributed framework installed at each edge node of the network, and an approach based on Artificial Intelligence to control and optimize non-terrestrial networks. The architectural solution can support the communication signaling necessary to implement control and optimization on a distributed network infrastructure. The control architecture can solve the issue of latency in infrastructure-less networks such as non-terrestrial networks. By moving the intelligence at the edge of the network, the technology can avoid the latency-costly communication exchange by a central controller and the edge nodes, which eventually reduces the performance of the system. The AI-based architecture ensures close to optimum network performance by avoiding modeling and mathematical solvers altogether. Instead, the performance of the system is tied to the performance data itself.

The technology can be used in a variety of applications, including the control and optimization of non-terrestrial wireless networks, the control and optimization of interplanetary networks, and the control and optimization of infrastructure-less terrestrial networks. The technology can be used for software-defined networking for infrastructure-less 5G and 6G networks. The technology can allow a network operator to control and optimize a distributed service network architecture, operate the network efficiently, and reduce the operational costs of service provisioning. The technology can allow a network operator to control and optimize a distributed service network architecture, provide superior quality of service to their users, and boot the performance of the network on demand.

In one aspect, a system for controlling a network of distributed non-terrestrial nodes is provided. The system includes a control framework, comprising one or more processors and memory, operative to train and control a plurality of the non-terrestrial nodes. The control framework includes a control interface in communication with a network operator to receive one or more specified control objectives. The control framework also includes a learning engine operative to train a virtual non-terrestrial network. The control framework is further operative to transfer knowledge gained through the training of the virtual non-terrestrial network to the network of distributed non-terrestrial nodes as data-driven logic unit configurations tailored for the specified control objectives.

In some embodiments, the non-terrestrial nodes are operative to execute the received data-driven logic unit configurations on-board based on local state information. In some embodiments, the non-terrestrial nodes are operative to communicate with each other to exchange local information for facilitating the execution of the received data-driven logic unit configurations. In some embodiments, the virtual non-terrestrial network includes a number of virtual non-terrestrial nodes each corresponding to one or more of the non-terrestrial nodes. In some embodiments, each of the virtual non-terrestrial nodes, when trained, corresponds to one or more of the data-driven logic unit configurations. In some embodiments, each of the data-driven logic unit configurations corresponds to one or more of the non-terrestrial nodes. In some embodiments, each of a plurality of the non-terrestrial nodes comprises an unmanned aerial vehicle (UAV). In some embodiments, each UAV includes a radio front-end operative for electronic communication with at least one other of the non-terrestrial nodes. In some embodiments, each UAV also includes a motion front-end operative to control a motion of the UAV.

In some embodiments, each UAV also includes a drone programmable protocol stack (DPPS) having a data-driven logic unit for operating the UAV. In some embodiments, the data-driven logic unit of the DPPS includes a neural network and the data-driven logic unit is a neural network configuration. In some embodiments, the neural network is at least one of a deep learning neural network, a reinforcement learning neural network, or a deep reinforcement learning neural network. In some embodiments, the neural network is a deep reinforcement learning neural network and the DPPS is a drone programmable protocol Stack (DRL DPPS). In some embodiments, the DRL DPPS of each UAV includes a DRL plane operative to execute a deep reinforcement learning neural network according to the corresponding neural network configuration using inputs corresponding to one or more current motion and network conditions of at least a portion of the network of distributed non-terrestrial nodes to determine motion and networking policies.

In some embodiments, the DRL DPPS of each UAV includes a data plane. In some embodiments, the data plane is operative to reconfigure motion control and networking stack parameters of the UAV responsive to the determined motion and networking policies. In some embodiments, the data plane is operative to determine the current motion and network conditions of the at least a portion of the network of distributed non-terrestrial nodes. In some embodiments, each UAV includes a register plane. In some embodiments, the register plane is operative to store the motion and networking policies determined by the DRL plane in one or more policy lookup tables. In some embodiments, the register plane is operative to store the current motion and network conditions determined by the data plane in one or more network state lookup tables. In some embodiments, the DRL plane is further operative to retrieve the current motion and network conditions from the one or more network state lookup tables of the register plane. In some embodiments, the data plane is operative to retrieve the motion and networking policies from the one or more policy lookup tables. In some embodiments, the data plane includes a plurality of operative layers, each of the operative layers corresponding to a networking or motion functionality. In some embodiments, the plurality of operative layers includes at least two of a motion layer, a physical layer, a MAC layer, a network layer, a transport layer, and an application layer.

In some embodiments, each UAV also includes a driver plane. In some embodiments, the driver plane includes flight control firmware operative to receive motion control information from the motion layer of the data plane and to operate the motion front-end in accordance with the motion control information. In some embodiments, the driver plane includes a software-defined radio operative to receive physical control information from the physical layer of the data plane and to operate the radio front-end in accordance with the physical control information. In some embodiments, the register plane includes at least one network state lookup table corresponding to each of the operative layers. In some embodiments, the register plane includes at least one policy lookup table corresponding to each of the operative layers.

In some embodiments, the learning engine also includes a virtual training environment operative to generate and train a corresponding one of the virtual non-terrestrial nodes for each of the UAVs, each of the corresponding virtual non-terrestrial nodes including a virtual UAV having a DRL DPPS. In some embodiments, the learning engine also includes a virtual testing environment operative to test the trained virtual UAVs. In some embodiments, the learning engine also includes a virtual emulation environment operative to emulate at least a motion layer and a physical layer of the DRL DPPS within the virtual training environment and the virtual testing environment. In some embodiments, the virtual emulation environment is in communication with a MAC layer of a data plane of the DRL DPPS of the virtual non-terrestrial node, one or more policy lookup tables of a register plane of the DRL DPPS of the virtual non-terrestrial node, and one or more network state lookup tables of the register plane of the DRL DPPS of the virtual non-terrestrial node. In some embodiments, the virtual emulation environment includes a common open research emulator (CORE) integrated with an extendable mobile ad-hoc network emulator (EMANE).

Additional features and aspects of the technology include the following:

1. A system for controlling a network of distributed non-terrestrial nodes comprising:
   a control framework, comprising one or more processors and memory, operative to train and control a plurality of the non-terrestrial nodes, the control framework comprising:
      a control interface in communication with a network operator to receive one or more specified control objectives, and
      a learning engine operative to train a virtual non-terrestrial network;
   wherein the control framework is further operative to transfer knowledge gained through the training of the virtual non-terrestrial network to the network of distributed non-terrestrial nodes as data-driven logic unit configurations tailored for the specified control objectives.

2. The system of claim 1, wherein the non-terrestrial nodes are operative to execute the received data-driven logic unit configurations on-board based on local state information.

3. The system of any of claims 1-2, wherein the non-terrestrial nodes are operative to communicate with each other to exchange local information for facilitating the execution of the received data-driven logic unit configurations.

4. The system of any of claims 1-3, wherein the virtual non-terrestrial network includes a number of virtual non-terrestrial nodes each corresponding to one or more of the non-terrestrial nodes.

5. The system of claim 4, wherein each of the virtual non-terrestrial nodes, when trained, corresponds to one or more of the data-driven logic unit configurations.

6. The system of any of claims 1-5, wherein each of the data-driven logic unit configurations corresponds to one or more of the non-terrestrial nodes.

7. The system of claim 6, wherein each of a plurality of the non-terrestrial nodes comprises an unmanned aerial vehicle (UAV) including:
   a radio front-end operative for electronic communication with at least one other of the non-terrestrial nodes;
   a motion front-end operative to control a motion of the UAV; and
   a drone programmable protocol stack (DPPS) having a data-driven logic unit for operating the UAV.

8. The system of claim 7, wherein the data-driven logic unit of the DPPS includes a neural network and the data-driven logic unit is a neural network configuration.

9. The system of claim 8, wherein the neural network is at least one of a deep learning neural network, a reinforcement learning neural network, or a deep reinforcement learning neural network.

10. The system of claim 9, wherein the neural network is a deep reinforcement learning neural network and the DPPS is a drone programmable protocol Stack (DRL DPPS).

11. The system of claim 10, wherein the DRL DPPS of each UAV includes a DRL plane operative to execute a deep reinforcement learning neural network according to the corresponding neural network configuration using inputs corresponding to one or more current motion and network conditions of at least a portion of the network of distributed non-terrestrial nodes to determine motion and networking policies.

12. The system of claim 11, wherein the DRL DPPS of each UAV includes a data plane operative to:
reconfigure motion control and networking stack parameters of the UAV responsive to the determined motion and networking policies; and
determine the current motion and network conditions of the at least a portion of the network of distributed non-terrestrial nodes.

13. The system of claim 12, wherein each UAV includes a register plane operative to:
store the motion and networking policies determined by the DRL plane in one or more policy lookup tables; and
store the current motion and network conditions determined by the data plane in one or more network state lookup tables.

14. The system of claim 13, wherein the DRL plane is further operative to retrieve the current motion and network conditions from the one or more network state lookup tables of the register plane.

15. The system of any of claims 13-14, wherein the data plane is operative to retrieve the motion and networking policies from the one or more policy lookup tables.

16. The system of any of claims 13-15, wherein the data plane includes a plurality of operative layers, each of the operative layers corresponding to a networking or motion functionality.

17. The system of claim 16, wherein the plurality of operative layers includes at least two of a motion layer, a physical layer, a MAC layer, a network layer, a transport layer, and an application layer.

18. The system of claim 17, further comprising a driver plane including:
a flight control firmware operative to receive motion control information from the motion layer of the data plane and to operate the motion front-end in accordance with the motion control information; and
a software-defined radio operative to receive physical control information from the physical layer of the data plane and to operate the radio front-end in accordance with the physical control information.

19. The system of any of claims 16-18, wherein the register plane includes at least one network state lookup table corresponding to each of the operative layers.

20. The system of any of claims 16-19, wherein the register plane includes at least one policy lookup table corresponding to each of the operative layers.

21. The system of any of claims 10-20, wherein the learning engine further comprises:
a virtual training environment operative to generate and train a corresponding one of the virtual non-terrestrial nodes for each of the UAVs, each of the corresponding virtual non-terrestrial nodes including a virtual UAV having a DRL DPPS;
a virtual testing environment operative to test the trained virtual UAVs; and
a virtual emulation environment operative to emulate at least a motion layer and a physical layer of the DRL DPPS within the virtual training environment and the virtual testing environment.

22. The system of claim 21, wherein the virtual emulation environment is in communication with a MAC layer of a data plane of the DRL DPPS of the virtual non-terrestrial node, one or more policy lookup tables of a register plane of the DRL DPPS of the virtual non-terrestrial node, and one or more network state lookup tables of the register plane of the DRL DPPS of the virtual non-terrestrial node.

23. The system of any of claims 21-22, wherein the virtual emulation environment includes a common open research emulator (CORE) integrated with an extendable mobile ad-hoc network emulator (EMANE).

DETAILED DESCRIPTION

Introduction

Figure 1:
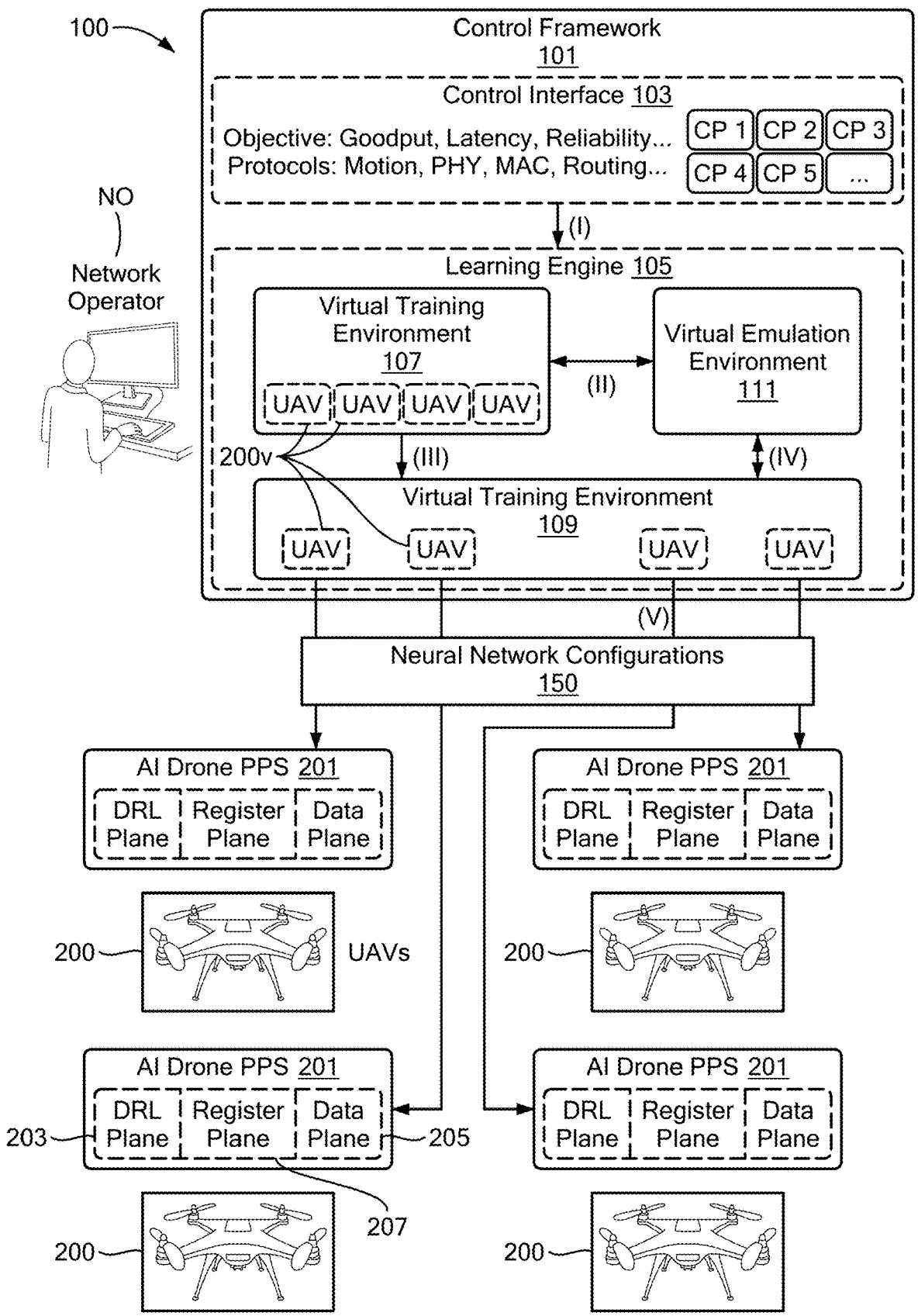
FIG. 1 is a schematic illustration of an embodiment of two-tier DRL-based architecture.

While fielding UAV networks can certainly enable a broad range of new applications, operating a UAV network and controlling (optimizing) its performance (e.g., throughput, latency, power consumption) presents several fundamental challenges when compared to fixed infrastructures. Examples of such challenges are as follows.

Challenge 1: Fully Wireless Access and Backhaul

UAV networks are fully wireless (i.e., access and backhaul) and their operations are extremely sensitive to spatially and temporally varying topologies and dynamic RF environments. Basic functionalities such as network formation and point-to-point communications are often impaired by unstable channel conditions and fragile network connectivity typical of infrastructure-less networked systems. This problem is further exacerbated by interference conditions, spectrum availability, and routing operations, which subject multi-hop communications to high and unpredictable delays.

Challenge 2: Centralized Control is not Practical

Traditional centralized network control approaches, which are typical of fixed-backhaul Radio Access Networks (RANs) applications, are in most cases unfeasible (or unpractical) in fully wireless networked systems. Centralized control approaches typically rely upon a centralized representation of the network (often made possible by collecting network state information over low-latency optical fiber links) to solve a centralized optimization problem and then distribute the solutions to the individual network nodes over the same low-latency wires. While centralized approaches have been applied with some success to fixed wired infrastructure and fixed-backhaul RAN systems, they face two fundamental challenges in infrastructure-less wireless networks (i.e., UAV networks, tactical ad hoc networks, mesh, sensor networks, machine-to-machine, Internet-of-things (IoT)), as discussed below.

Challenge: 2.1: NP-Hard Control Problems

Optimizing a distributed wireless network where both access and backhaul operate on the same frequency bands is non-trivial. The centralized formulation of the control problem requires very accurate modeling and, in most cases, is NP-hard because of the non-linear coupling of the many variables involved. The use of heuristics and approximation algorithms necessary to solve the problem often results in sub-optimal solutions. Furthermore, this optimality gap might grow further in highly dynamic and unpredictable infrastructure-less UAV networks, which may make model-based solutions too inaccurate to be of practical relevance.

Challenge: 2.2: Stale Information, Ineffective Control

Information retrieval in multi-hop infrastructures suffers from inherent latency because of the need to relay information over wireless links. The resulting latency may impact the Age of Information (AoI) of the gathered data, which eventually results in stale network state information at the central controller. Consequently, the centralized network state representation might significantly differ from the actual network state. This problem can negatively affect the control process as the solutions computed are optimal with respect to the stale collected information, and thus potentially inefficient at actuation time. The latency also determines how quickly solutions computed at the central controller are dispatched to individual wireless nodes. By the time the computed solutions are delivered to the wireless nodes, the network state may have changed, thus making their implementation ineffective.

Aspects of the technology provided herein that address Challenge 1 and Challenge 2 include, for example, software-defined UAVs equipped with programmable radio front-ends and flight control units (FCU). The real-time reconfigurability of motion, PHY, and upper-layer operations are leveraged to implement full-stack cross-layer optimization. Reconfigurability of functionalities at all layers of the protocol stack has already been demonstrated to provide superior performance with respect to systems based on inflexible hardware unable to adapt to dynamic spectrum conditions.

Furthermore, to control the operations of the network of UAVs, a two-tier architecture is provided that addresses the challenges of distributed wireless system optimization mentioned above. The UAV network control problem, in accordance with various embodiments, can be addressed via data-driven optimization. A multi-agent Deep Reinforcement Learning (DRL) approach is provided where multiple distributed agents adapt their network parameters cooperatively to optimize a chosen network utility function. With enough data and training time, this approach guarantees optimal decision-making of the agent's networking and motion operation with respect to the defined objective function, without requiring explicit network modeling or a mathematical control problem formulation.

Challenge 3: UAV Network Data Trace Generation

How to guarantee sufficient training data to the DRL agents in UAV networks is the third challenge. UAV networks are battery-powered networks with time-constrained operations. Training a multi-node UAV network through real-world experiments would require excessive manpower and frequent battery charging, ultimately reducing the benefits of data-driven optimization approaches. While simulation environments are cost-effective tools to produce large datasets, they often fail in capturing typical real-time network dynamics or real-world systems (e.g., retransmissions, fragmentation, and buffer delays) that are hard or computationally expensive to model. On the other hand, full-stack emulation tools (e.g., NS-3) provide a more accurate representation of the real-time operations of a UAV network. Unfortunately, these tools are so far mainly focused on implementing a subset of common wireless standards (e.g., Wi-Fi, LTE, 5G NR), often abstracting a number of low-level details, which make them still unsuitable to accurately represent fully reconfigurable wireless protocol stacks for UAVs. Given these limitations, how to produce training data that is representative of networked systems with UAVs employing fully reconfigurable wireless protocols stacks is still an open problem.

To address Challenge 3, the technology described herein provides a DRL-based architecture that integrates the Drone networking protocol stack with the Common Open Research Emulator (CORE) and the Extendable Mobile Ad-hoc Network Emulator (EMANE) framework. This integration provides real-time emulation capabilities for fully configurable wireless (and motion) protocol stacks for UAVs. This integrated virtual environment can be used to generate extensive data traces with a high degree of realism and to scale up the training process.

At a high level, the technology described herein provides a variety of aspects, features, and embodiments, including the following:

A Two-Tier Architecture for UAV Network Control

A two-tier architecture is provided comprising a control framework and a drone programmable protocol stack (DPPS) such as a DRL Drone Programmable Protocol Stack (DRL DPPS). The Network Operator (NO) uses the control framework to dictate the desired behavior of a distributed UAV network. The solution automatically generates, for example, a set of data-driven logic unit configurations (e.g., DRL agents—a set of policies in the form of neural networks (NNs)) that are trained in a virtual environment within the control framework. Once trained, the data-driven logic unit configurations (e.g., NN configurations) are tested and automatically distributed to the individual network nodes, where they can be used to control networking and motion parameters in the DPPS (e.g., DRL. Drone Programmable Protocol Stack (DRL DPPS)). In this way, the individual UAVs distributively implement the NO's objective by optimizing their network performance in real time. By distributing the data-driven logic unit configuration once, and by enforcing the desired network control policy at the edge nodes of the network, this approach does not suffer from stale information retrieval and delayed command typical of centralized control systems. Moreover, NN-based policies described herein envision full-stack and cross-layer optimization of flight and wireless networking parameters alike, thanks to the use of programmable motion and RF front-ends.

A Data-Driven Control Approach

The UAV network control problem can be solved generally by deep learning, reinforcement learning, and/or deep reinforcement learning, including, advantageously, via DRL as described in greater detail below. A multi-agent DRL scenario can be employed where each UAV is a different agent, and complex UAV fielding can be collectively trained in a virtual environment for a specific flight mission. Upon training completion, mission-tailored NN configurations can be tested and distributed to individual UAVs. These use them to compute networking and motion policies to achieve the NO's desired network behavior by adapting to the dynamic network conditions. Compared to model-based optimization, this data-driven approach addresses inaccurate modeling formulation and optimization approximations. Unlike optimization approaches, the DRL agents do not suffer from optimization solver latency and can derive policies with $\mathcal{O}(1)$ complexity.

A 'Ready-to-Fly' Virtual Environment

To collect extensive performance data for battery-powered UAV networks, a highly representative emulation virtual environment can be provided. The Drone Programmable Protocol Stack (DPPS) can be integrated with machine learning features to produce a data-driven logic unit DPPS such as, for example, a DPPS having integrated deep reinforcement learning features, referred to as DRL DPPS. The DRL DPPS can be integrated with the CORE/EMANE emulation tools to obtain a high-fidelity virtual environment that captures the motion, wireless channel, and higher-layer protocol stack interactions alike. The 'ready-to-fly' virtual environment can be systematically employed to collect extensive high-fidelity network performance data. Ultimately, this integration effort produces a highly representative emulation environment that allows the scaling up of the learning time and training the DRL agents with a high degree of realism.

Through a series of well-crafted experiments, the effectiveness has been proven of the control approach in optimizing the desired network performance objectives (up to 3.7× throughput gains and 0.2× latency reduction), network reconfigurability to different control problems through re-distribution of NN configurations, and scalability to large UAV networks.

In the following description, a system for controlling a network of distributed non-terrestrial nodes is provided. As used herein, the term "non-terrestrial" refers to any network node not constrained to a fixed geospatial position, particularly, although not exclusively, wherein the node is provided with freedom of movement along an altitudinal axis as well as along east/west and north/south axes. Such nodes may include, for example, submarine-capable watercraft, aircraft, and/or spacecraft. In the description, initially, a general overview of the system is provided, followed by introduction of a control framework and then a DRL Drone Programmable Protocol Stack (DRL DPPS), respectively. These are two building blocks of the architecture. Then, integration of the DRL DPPS with a virtual emulation environment (e.g., CORE/EMANE emulation tools) is described and provides a baseline for the data-driven optimization. UAV network optimization performance assessments are then described, followed by a discussion of the advantages of the technology provided herein. Finally, features of the described technology are summarized.

System Overview

Referring now to FIG. 1, a system 100 for controlling a network of distributed non-terrestrial nodes in accordance with various embodiments generally includes a control framework 101 in communication with a network of non-terrestrial nodes 200 (e.g., unmanned aerial vehicles, hereinafter "UAVs", as shown). The control framework 101 includes a control interface 103 for receiving input from a network operator NO and a learning engine 105 configured to generate, train, and test virtual non-terrestrial nodes 200v, each corresponding to at least one of the non-terrestrial nodes 200 of the network. The learning engine 105 includes a virtual training environment 107 for training the virtual non-terrestrial nodes 200v for each of the non-terrestrial nodes 200 of the network, a virtual testing environment 109 for testing the trained virtual non-terrestrial nodes 200v, and a virtual emulation environment 111 for emulating motion and physical characteristics of the virtual non-terrestrial nodes 200v. Based on the training and testing, the control framework 101 then produces and transmits data-driven logic unit configurations (e.g., neural network configurations 150 as shown) corresponding to each of the non-terrestrial nodes 200 of the network to provide each of the non-terrestrial nodes 200 with appropriate guidance to facilitate the overall network achieving network conditions input by the NO.

Figure 2:
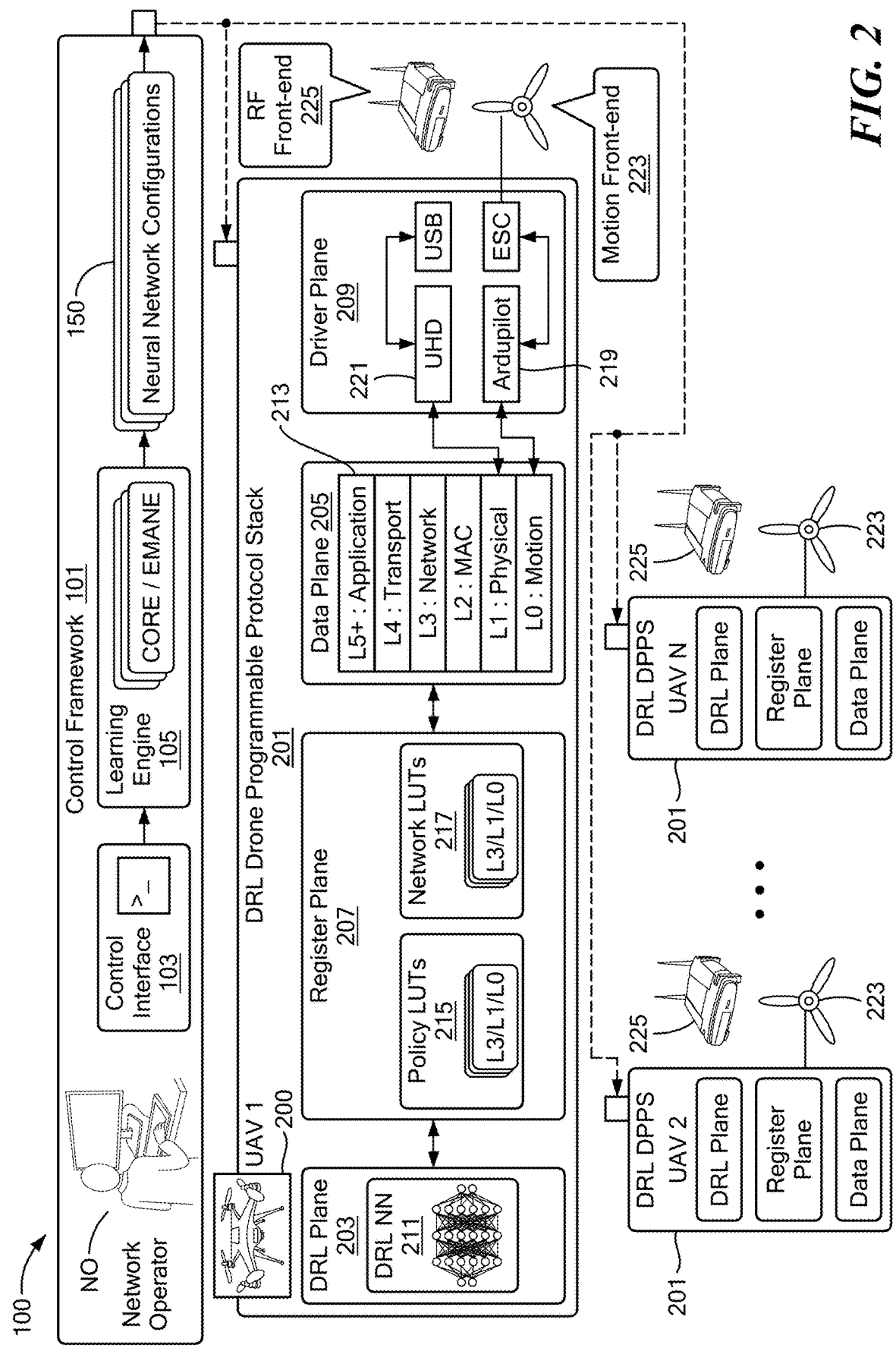
FIG. 2 is a schematic illustration of an embodiment of a three-plane DRL Drone Programmable Protocol Stack architectural design.

Referring now to FIGS. 1 and 2, each of the non-terrestrial nodes 200 includes a data-driven logic unit DPPS (e.g., a deep reinforcement learning drone programmable protocol stack (DRL DPPS) 201 as shown) to facilitate operation thereof. The DRL DPPS 201 includes a data-driven logic unit plane (e.g., DRL plane 203) having a data-driven logic unit (e.g., a DRL neural network (DRL NN) 211 as shown) for execution according to a corresponding one of the data-driven logic unit configurations (e.g., neural network configurations 150) using inputs corresponding to one or more current motion and network conditions associated with of at least some of the non-terrestrial nodes 200 in the network. The execution of the data-driven logic unit (e.g., DRL NN 211) is used by the data-driven logic unit plane (e.g., DRL plane 203) to determine motion and networking policies for the non-terrestrial node 200.

For simplicity, data-driven logic unit configurations, data-driven logic unit DPPS, data-driven logic unit plane, and data-driven logic unit will be referred to as NN configurations, DRL DPPS, DRL plane, and DRL or NN going forward consistent with the illustrated examples. However, it will be apparent in view of this disclosure that any suitable type of data-driven logic unit can be used in accordance with various embodiments, including, for example, deep learning, reinforcement learning, DRL, other data-driven logic units, or combinations thereof.

The DRL DPPS 201 also includes a data plane 205 for reconfiguring operational characteristics of the non-terrestrial nodes 200 to execute the determined motion and networking policies and for determining current motion and networking conditions of both the non-terrestrial node 200 and at least some of the other non-terrestrial nodes 200 in the network. The data plane 205 includes a stack of operative layers 213 to facilitate control and reconfiguration of various aspects of the non-terrestrial node 200. For example, as shown in FIG. 2, the operative layers 213 can include a motion layer, a physical layer, a MAC layer, a network layer, a transport layer, and an application layer. However, it will be apparent in view of this disclosure that, in some embodiments, the stack can include more, fewer, and/or different operative layers 213 depending on, for example but not limited to, the type of node, network objectives, and/or hardware capabilities. Reconfiguration of physical and motion layers in the data plane 205 can be effectuated by a driver plane 209 having a flight control firmware 219 for receiving the motion control information from the motion layer of the data plane 205 and to operate a motion front-end 223 (e.g., motion hardware such as motors, propellers, rotors, control surfaces, and/or throttles) in accordance with the motion control information and also having a software-defined radio 221 for receiving physical control information from the physical layer of the data plane 205 to operate a radio front-end 225 (e.g., radio hardware such as receivers, transmitters, transceivers, transmission power control, and/or signal processing hardware) in accordance with the physical control information.

The DRL DPPS 201 can also include a register plane 207 to facilitate communication of information between the DRL plane 203 and the data plane 205. In particular, the register plane 207 can include one or more policy lookup tables 215 for storing the motion and networking policies determined by the DRL plane 203 and can also include one or more network state lookup tables 217 for storing the current motion and network conditions determined by the data plane 205. In addition, the DRL plane 203 can access the network state lookup tables 217 to retrieve the input data corresponding to the current motion and networking state when executing the DRL NN 211. Similarly, the data plane 205 can access the policy lookup tables 215 to retrieve the motion and networking policies when reconfiguring the motion control and networking stack parameters of the operative layers 213. In some embodiments, a number of the policy lookup tables 215 can match a number of the operative layers 213 in the stack and each policy lookup table 215 can correspond to one of the operative layers 213. Similarly, in some embodiments, a number of the network state lookup tables 217 can match a number of the operative layers 213 in the stack and each network state lookup table 217 can correspond to one of the operative layers 213

Figure 3:
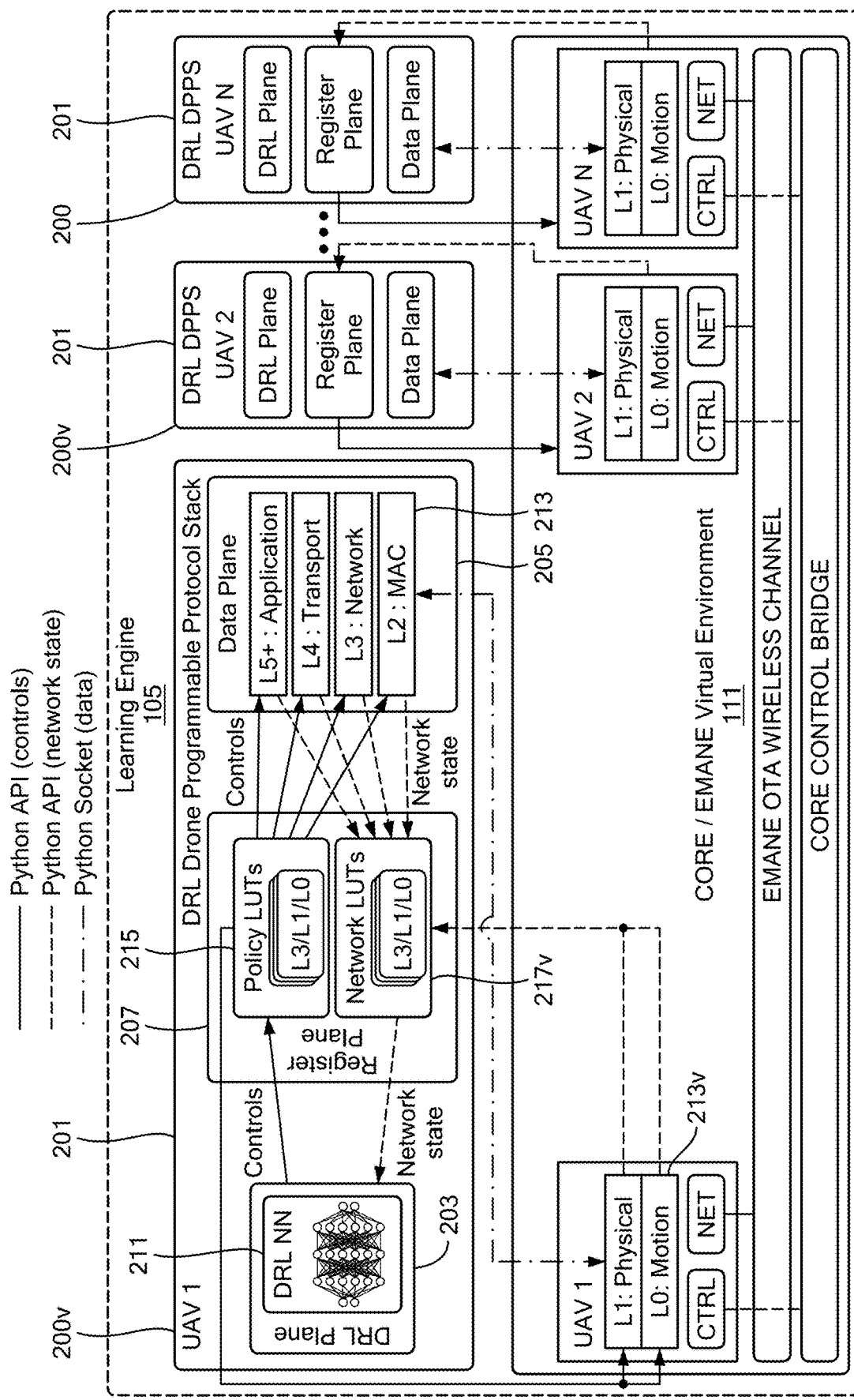
FIG. 3 is a schematic illustration of an embodiment of a learning engine architecture.

Referring now to FIGS. 1 and 3, the learning engine 105, via the virtual training environment 107, the virtual emulation environment 111, and the virtual testing environment 109, generates a plurality of virtual non-terrestrial nodes 200v, each corresponding to at least one of the non-terrestrial nodes 200. The virtual non-terrestrial nodes 200v include similar features to those of the non-terrestrial nodes 200. In particular, as shown in FIG. 3, the virtual non-terrestrial nodes 200v each include a DRL DPPS 201. Similar to the DRL DPPS 201 of the non-terrestrial nodes 200, the DRL DPPS 201 of the virtual non-terrestrial nodes 200v includes a DRL plane 203 having a DRL NN 211, a register plane 207 having policy lookup tables 215 and network state lookup tables 217.

The DRL DPPS 201 of the virtual non-terrestrial nodes 200v can also include a data plane 205 having a stack of operative layers 213. However, as shown in FIG. 3, in some embodiments, because there is no actual hardware associated with the virtual non-terrestrial nodes 200v, virtual physical and virtual motion operative layers 213v can be provided and reconfigured by the virtual emulation environment 111.

The Control Framework

FIG. 1 provides a top-level view of an embodiment of the two-tier system architecture provided herein. This includes the control framework 101 and the Deep Reinforcement Learning Drone Programmable Protocol Stack (DRL DPPS) 201. The control framework 101 interfaces with the Network Operator NO, whose goal is to define a flight mission and dictate the desired control objective of the UAV network. The control framework 101 integrates deep reinforcement learning algorithms in its learning engine 105 to train a multi-agent UAV network in an emulated environment (without the burden of planning real flight operations). Once the training terminates, the control framework 101 tests and dispatches the objective-specific neural network (NN) configurations to the DRL DPPS. The latter implements a complete wireless protocol stack for UAVs inclusive of radio front-end and motion layer. The tasks are to support motion and networking functionalities for the UAV network operations and to optimize precise control parameters (determined by the NO in the first place) to achieve the NO's dictated control objective. This last task is performed by executing the pre-trained NN on board, whose configurations are received from the control framework 101. These two architectural components are described in greater detail below.

The Control Interface

The control framework 101 interfaces with the network operator (NO) through the control interface 103. The latter is used to specify the desired flight mission and a UAV network control objective such as "maximize the end-to-end throughput", "maximize network capacity", "minimize the power consumption" (see (I) in FIG. 1). The control interface 103 is also useful to specify what control parameters the NO wants to optimize, and which ones should be kept fixed. These include functionalities at any layer 213 of the protocol stack (if programmable) as well as motion operations alike. Examples of possible control parameters include: "nodes' locations in the 3D space", "transmission power", and "forwarding decisions". When UAVs are equipped with programmable radio front-ends (e.g., by including software-defined radios 221) physical layer parameters such as "transmission power" and "carrier frequency" can be selected as a control parameter. Additionally, the NO can specify node- or layer-specific constraints, such as fixing a UAV's runtime location or limiting the maximum transmission power across all nodes. Ultimately, through the control interface 103, the NO can design a UAV network fielding for a specific mission and dictate a specific network behavior. For example, a hypothetical example directive could include the following:

The UAV network includes 6 nodes. Two UAVs are location-constrained and hover close to two sensitive targets (sensing tasks). Two other UAVs are location-constrained and hover close to two base camps (reporting tasks), while the remaining two nodes can hover freely and can operate as relays. All the nodes can reconfigure their transmission power as well as their location in case they are not constrained. The network control objective of the mission is to maximize the aggregate end-to-end throughput of the traffic going from sensing target 1 to base camp 1 and from sensing target 2 to base camp 2.

This example directive can be specified through a few lines of code via the control interface 103 as illustrated in Listing 1. The NO specifies the number of UAVs involved in the fielding (N_uavs, Line 2), as well as sensing and reporting areas (Lines 8-13). For example, sensing areas could correspond to sensitive targets on the ground to be monitored or recorded. Reporting areas could correspond to locations where to offload the data, such as a base camp. The control interface 103 handles these inputs and creates a UAV network configuration where one UAV can be assigned to each of these areas. In this case, UAV 1 is instructed to hover on the sensing area 1, while UAV 2, UAV 3, and UAV 4 are assigned to sensing area 2, report area 1, and report area 2, respectively. UAV 5 and UAV 6 are free to hover. The NO also specifies which UAV parameters can be controlled (Line 16) and the network control objective, specified as to maximize the aggregate throughput at the report areas (Line 29). This input altogether can be handled by the control interface 103 by creating UAV objects and assigning control variables to them (Lines 19-26). The constructed network configuration can be used in the learning engine 105 to instantiate a virtual UAV network and optimize the UAVs' policy making so as to match the NO's desired control objective.

Listing 1

```
# Set number of UAVs
N_uavs = 6
# Creating network
nwk = Network.create(N_uavs)
# Set up monitoring areas
nwk.add_area("sensing", x_1, y_1)
nwk.add_area("sensing", x_2, y_2)
# Set up reporting areas
nwk.add_area("report", x_3, y_3)
nwk.add_area("report", x_4, y_4)
# Set up control variables
controls = (LOC, TX_POW)
# Create UAVs and assign control variables
nwk.get_UAV(1).set(location = [x_1, y_1], actions = [TX_POW], session = 1, role = source)
nwk.get_UAV(2).set(location = [x_2, y_2], actions = [TX_POW], session = 2, role = source)
nwk.get_UAV(3).set(location = [x_3, y_3], actions = [TX_POW], session = 1, role = destination)
nwk.get_UAV(4).set(location = [x_4, y_4], actions = [TX_POW], session = 2, role = destination)
nwk.get_UAV(5).set(actions = [LOC, TX_POW], role = relay)
nwk.get_UAV(6).set(actions = [LOC, TX_POW], role = relay)
# Set up control objective
obj = max(sum(nwk.get_Th(role = destination))
```

The Learning Engine

Previous work has focused on tackling this class of problems by first mathematically formulating the underlying network control problem, and then solving it through constraint relaxation, decomposition theory, and convex optimization. Indeed, these approaches guarantee scalability, ease of reconfigurability, and operate in a distributed fashion. However, their performance can be bound to the accuracy of the employed (motion, channel, switching, etc.) models and to the quality of the performed mathematical relaxations necessary to deem the problem solvable through convex optimization. A key drawback is that the model-based approaches fail to capture network operations such as retransmissions, fragmentation, buffer delays, MAC accesses, failed sensor readings, and all other network architecture dynamics that are hard (or computationally expensive) to model. While the differences and inaccuracies between the model and the actual implementation can be safely neglected for small network instances, the negative effect of such inaccuracies on network performance (or the model complexity, and thus the solver convergence time) might increase when considering more complex and large network instances. For these reasons, the technology provided herein employs a data-driven approach and aims to solve the UAV network control problem through Deep Reinforcement Learning (DRL).

Deep Reinforcement Learning (DRL)-based approaches have progressively gained the attention of the wireless community to address a variety of critical spectrum access challenges, such as handover and power management in cellular networks, dynamic spectrum access, resource allocation/slicing/caching, modulation/coding scheme selection, among others. The driver of this success story lies in the ability of DRL to optimize the performance of a system by solving partially observable Markov Decision processes (POMDP)-based problems without explicitly providing any details on the model, which is instead learned by observing and exploring the environment. Complex wireless network control problems are no exception. Therefore, DRL provides an effective tool to design control policies that optimize wireless networked systems that are hard-to-model and hard-to-solve, whose network control problem' representation might excessively differ from the final fielding and whose formulations need to go through several approximations before being deemed solvable; whose control decisions involve a set of known network actions (e.g., UAV locations, TX power, modulation, coding, medium access, routing, and transport parameters) according to the current wireless environment and optimization objective; and/or where DRL training can leverage extensive and representative datasets with detailed information on network performance and conditions.

However, collecting extensive and representative performance data is hard, especially in battery-powered UAV networks. Limited flight time, the need to recharge and replace batteries frequently, and flight location regulations pose significant challenges to the collection of experimental data for the DRL training of UAV networks. To overcome this limitation, a learning engine 105 architecture is provided that integrates the Drone Programmable Protocol Stack (DPPS) employed in real UAV networks fielding with the Common Open Research Emulator (CORE) and the Extendable Mobile Ad-hoc Network Emulator (EMANE), a framework that provides detailed radio models and mobile networks scenarios. This integration allows for extensive full-stack data collection in a representative emulated environment that captures the dynamics of real network implementations. This integrated environment can be employed in the learning engine 105 to emulate the UAV network configured through the control interface 103 and to measure its performance for a wide range of configuration parameters. Most importantly, this integrated environment allows the performance of high-fidelity UAV network performance data collection at scale. This architectural system provides a baseline for the data-driven UAV network optimization.

In a nutshell, the training phase works as follows. The learning engine 105 instantiates a virtual UAV network based on the configuration expressed by the NO through the control interface 103 in the virtual training environment 107. As shown in Listing 1, this includes the exact number of UAVs, their flight mission (sensing and report areas), a list of control parameters that can be leveraged to optimize the performance of the fielding, and the overall network control objective (e.g., 'maximize end-to-end throughput'). In the virtual UAV network of the virtual training environment 107, each virtual UAV 200v is an independent agent employing a DRL Drone Programmable Protocol Stack (DRL DPPS) 201 to carry on motion and wireless stack operations. During the training phase, the DRL DPPS 201 is interfaced with the CORE/EMANE emulation environment which, in some embodiments, is where motion and physical layer functionalities are executed. As can be seen in greater detail in connection with the description of the DRL DPPS 201 below, the individual agents' DRL DPPS 201 features a neural network (NN) 211 for policy decision-making. The NN 211 input and output layers are dimensioned according to the problem inputs and the control variables in play. The NN 211 can be used by the agents to perform cross-layer optimization by jointly deriving wireless and motion policies at once. In the learning engine 105, the agents' NNs 211 are trained for the specific mission. Due to the virtual environment, extensive performance data collection can be performed and optimal policy making strategies can be derived that optimize the desired control objective dictated by the Network Operator (see (II) in FIG. 1). Finally, the performance of the trained NNs is tested in the virtual testing environment (see (III) in FIG. 1), which interacts with the CORE/EMANE emulation tool, similarly to how the virtual training environment does (see (IV) in FIG. 1). The testing phase's main task is generally to verify the quality of the just-concluded training in terms of control objective optimization before sending the network configurations to the UAVs. The components of this integration effort and how the training process operates are explained in greater detail below with reference to the Ready-to-Fly Virtual Environment.

Neural Network Configurations

Once the virtual testing environment has trained and tested the NNs, the control framework 101 distributes the NN configurations to the individual network nodes (the agents) over the wireless interface (see (V) in FIG. 1). Specifically, each UAV receives a different NN Configuration. These configurations are employed at the individual UAVs' DRL Drone Programmable Protocol Stack (DRL DPPS) throughout the mission to optimize the network parameters in real-time. Once dispatched, and differently from the emulated DRL DPPS, the NNs interact with hardware radio and motion front-ends 223. This way, the agents use the received NN configurations to adapt to the dynamic network conditions and to achieve the overall network behavior defined by the Network Operator. The neural network configurations 150 include the DRL NN to be executed by the DRL DPPS and a configuration file. The configuration file provides information about the dimension of the DRL NN, a mapping between the input neurons of the DRL NN and the UAV network state information, and a mapping between the output neurons of the DRL NN and the UAV's control parameters. In addition, the NNs' internal layers are dimensioned according to the state space and the action space, as can be seen in detail with reference to the ready-to-fly virtual environment.

An example of NN configuration file for UAV '5' is provided in Listing 2 below. According to the example reported in the example directive provided above, each NN has 12 inputs, which are mapped to specific UAV network variables: the location of the 6 UAVs and their TX power. The outputs of each NN are instead 15 (the cartesian product between the possible control actions) and are mapped to the control variables of the UAV of interest. For instance, in the case of UAV '5', the 15 NN's output correspond to the combinations of the 5 allowed control actions for the UAV's location (move north, move east, move south, move west, and keep fixed) and the 3 allowed actions for the UAV's TX power (increase TX power, decrease TX power, and keep TX power fixed). The first UAV's 5's NN's output corresponds to a movement of UAV 5 one step north and to an increase of its TX power; the second NN's output corresponds to a movement of UAV 5 one step east and also increases its TX power, and so on. The nodes use this file to feed the DRL NN the correct network state information, and at the same time to interpret the outcomes of the DRL NN and translate them into actions.

Although EMANE makes it possible to specify the three-dimensional location of each UAV, as well as the velocity at which each UAV navigates within the emulated area, for the sake of illustration it is assumed that all UAVs move at the same velocity and hover at the same altitude.

Listing 2

```
<NN_size>
    <NN_inputs> 12 </NN_inputs>
    <NN_layers> 50, 50 </NN_layers>
    <NN_outputs> 15 </NN_outputs>
</NN_size>
<input_map>
    <in1> UAV1.LOC </in1>
    <in2> UAV1.TX_POW </in2>
    <in3> UAV2.LOC </in3>
    <in4> UAV2.TX_POW </in4>
    ...
</input_map>
<output_map>
    <out1> UAV5.LOC.NORTH, UAV5.TX_POW.UP </out1>
    <out2> UAV5.LOC.NORTH, UAV5.TX_POW.DOWN </out2>
    <out3> UAV5.LOC.NORTH, UAV5.TX_POW.KEEP </out3>
    <out4> UAV5.LOC.EAST, UAV5.TX_POW.UP </out4>
    ...
</output_map>
```

Different from central control approaches, this procedure does not suffer from stale information retrieval and control latency. This is because the neural network configurations 150 are dispatched once, thus allowing nodes to optimize performance directly at the edge of the network and in a distributed fashion. The many hours of emulated flight and networking experiments carried on by the learning engine 105 help reduce the performance gap between model and implementation typical of model-based approaches. As discussed with reference to the ready-to-fly virtual environment, training procedures can be accelerated via environment parallelization.

This approach facilitates reconfigurability of the network and objectives. Specifically, to change the behavior of a network, it is sufficient to define a new control objective. The control framework 101 will take care of re-training and distributing new neural network configurations 150. Moreover, it is worth mentioning that previously trained neural network configurations 150 can be stored locally and fetched on-demand for later uses, which eliminates the problem of re-training the NNs for common and previously solved control problems.

The DRL Drone Programmable Protocol Stack

An overview of the DRL Drone Programmable Protocol Stack (DRL DPPS) 201 architecture is reported in FIG. 2. The DRL DPPS 201 is used at individual UAVs to carry motion and wireless operations at all layers of the protocol stack, as well as in the learning engine 105 to train and test the NN policy making for specific mission objectives. In the latter, the Physical layer and Motion operations are performed by the virtualized CORE/EMANE environment, while in the former these operations are implemented through hardware motion and Rf front-end 225. By employing the whole DRL DPPS 201 architecture in the learning engine 105 (with the exclusion of the hardware front-ends), a realistic emulation environment is obtained which enables to the high-fidelity performance data collection and effective DRL training. With this premise in mind, the DRL DPPS 201 design choices and implementation details are described below. Furthermore, the details on how the DRL DPPS is interfaced with CORE/EMANE and employed in the learning engine 105 are discussed with reference to the ready-to-fly virtual environment.

To implement the wireless protocol stack of the UAV nodes, start from the Drone Programmable Protocol Stack. This architecture concerns three planes: the decision plane, the register plane 207, and the data plane 205. In the three-plane design, the decision plane is replaced with the new DRI plane 203, while maintaining its architectural functionality; to optimize the networking and motion control parameters at once in a cross-layer fashion. This new architecture is termed the DRL Drone Programmable Protocol Stack (DRL DPPS). Here are summarized the three planes' functionalities and the interactions with one another.

DRL Plane

Upon receiving the neural network configurations 150 from the control framework 101, each UAV (agent) stores it in the DRL DPPS Decision Plane. The DRL plane 203 is in charge of determining the optimal motion and networking policies in real time, by dynamically adapting to the changing network conditions and making decisions on up-to-date UAV network state information. To derive mission-tailored policy optimization at every given time, the DRL plane 203 executes the NN by feeding its inputs and interpreting its outputs according to the received configuration file. The simplicity of a widely adopted DRL variant called Q-learning can be used, which aims at optimizing an estimate (called Q function) of the objective function to be maximized (i.e., the NO's objective). The NN employed by the DRL is a Deep Q-Network (DQN) which uses stochastic gradient descent (SGD) to approximate the Q-function. These design choices are described in more detail in discussed with reference to the ready-to-fly virtual environment. What is most important from an architectural standpoint is that the adopted DRL approach approximates a complex optimization function by means of a relatively simple neural network that can be 'probed' in real time with $\mathcal{O}(1)$ complexity. This design allows for rapid calculation of new policies which can be implemented at the data plane 205 with negligible latency which, instead, would be hard to avoid when using traditional mathematical solvers.

Data Plane

The data plane 205 is responsible for implementing the computed optimal policies by reconfiguring motion control and networking stack parameters. To do so, this plane implements a programmable protocol stack spanning all networking layers 213 with the addition of the motion layer ('Layer 0'.) The protocol stack is fully programmable in software and exposes control APIs to tune key control parameters at all layers 213 of the stack, including MAC, Physical, and Motion. This is possible thanks to the adoption of open-source flight control firmware 219 (e.g., Ardupilot, used herein) and software-defined radios (SDRs) 221 as radio front-end. These are programmable hardware that implements the Physical and MAC layer functionalities in software and make them controllable in real-time by the OS. In this way, the data plane 205 provides the necessary tools to prototype cross-layer control algorithms spanning multiple (potentially all) layers 213 of the protocols stack—plus motion—all at once.

The control interface 103 between the data plane 205 and the DRL plane 203 is dual-purpose and operates as follows:
- the NN 211 can retrieve network state information from the data plane 205 through the register plane 207 (e.g., UAVs' locations, UAVs' TX power, etc.) to determine the current UAV network state within the DRL's defined state space;
- the data plane 205 can configure the networking and motion parameters of the programmable protocol stack following the optimized policies suggested by the NN (e.g., adopt a new 'UAV location' in space, decrease the node's 'TX power', etc.) The latest optimal policies are stored in the register plane 207.

When the DRL DPPS is installed on the UAVs (see FIG. 2), the lower layers 213 of the programmable protocol stack (Physical and Motion) interface with the radio front-ends 225 and motion front-ends 223 hardware through the software-defined radio 221 (i.e., USRP hardware driver (UHD)) and the flight controller (i.e., Ardupilot) drivers. These in turn control the hardware through the universal serial bus (USB 3.0) and electronic speed control (ESC) interfaces, as illustrated in FIG. 2. When the DRL DPPS is instantiated in the learning engine 105 (described below in connection with FIG. 3), these two layers do not drive external hardware but instead interface with CORE/EMANE which takes care of emulating the motion and physical layer functionalities. Due to this architectural design, the data plane 205 guarantees the use of the same programmable protocol stack architecture (and its real-time operations) whether the DRL DPPS is interfaced with real hardware or the CORE/EMANE emulation environment. This is the architectural feature at the core of the extensive UAV network data collection.

Register Plane

The register plane 207 acts as a middleware allowing the DRI plane 203 to retrieve fresh network state information from the data plane 205; and making the computed optimal policies available to the data plane 205 through a set of dedicated lookup tables (LUTs). Each protocol stack layer 213 has a dedicated network state LUT 217 in the register plane 207 where to store all the layer-related network state parameters that are used to represent the DRL state space (e.g., the neighboring UAV locations, the neighboring nodes' TX power, etc.). Conversely, dynamically re-calculated at regular intervals, optimal policies are stored in a similar way in dedicated policy LUTs 215, one per control variable of interest (e.g., optimal UAV location, optimal TX power, etc.)

A Ready-to-Fly Virtual Environment

Among the main contributions of this work is the integration of the DRL DPPS described above with the CORE/EMANE emulation tools. The goal of this integration effort is two-fold:
1. To develop a high-fidelity emulation environment capturing both real-time wireless channel phenomena (e.g., path-loss, delay spread, interference) and networking operations at all layers 213 of the protocol stack (e.g., packetization, segmentation, re-transmissions, traffic bursts, processing delay) which are hard or expensive to model and can only be approximated in simulations;
2. To provide researchers with a reconfigurable emulation tool to design different UAV network configurations and topologies and collect high-fidelity UAV network performance data at scale. This effort serves as an effective alternative to the collection of experimental performance data for battery-powered UAV networks that is both time- and resource-expensive. Collecting a high volume of UAV network performance data is the foundation of the development of data-driven optimization.

At the same time, this emulation tool can be employed to test UAV network configurations before experimental implementation. These two operations are performed in the learning engine 105, in the virtual training environment and virtual testing environment, respectively. A description of the development of the ready-to-flight emulation environment is provided in the following.

Integrating the DRL DPPS with CORE/EMANE

EMANE is an open-source wireless network emulator developed and maintained by U.S. Naval Research Labs (NRL) and Adjacent Link LLC. EMANE provides a complete and flexible emulation of both physical and MAC layers network modules, as well as providing functionalities to control network topology and node location. Additionally, EMANE embeds an Over-The-Air (OTA) channel emulator component, which allows the configuration of wireless medium propagation characteristics such as fast and slow fading, delay spread, and interference patterns among others. CORE instead provides high-level functionalities like virtualization, network bridge construction, and APIs to instantiate EMANE nodes and conveniently setup Location and Physical layer parameters in EMANE. Importantly, CORE exposes controls to EMANE's parameters (e.g., nodes' location, transmission powers) via a set of APIs configurable in real time.

This way, CORE/EMANE represents a full-fledged and comprehensive emulation environment for designing and performing wireless network experiments with diverse topologies, RF conditions, and mobility patterns.

As discussed above, the DRL DPPS implements a full protocol stack for UAVs. This performs the wireless stack operations from the Physical to the Application layer, with the addition of flight control functionalities carried out by the Motion layer. By integrating the DRL DPPS and CORE/EMANE emulator, a full-stack emulation environment can be obtained that is representative not only of the channel propagation dynamics, but also of the protocol stack operations internal to individual wireless UAVs. This integration provides a framework where UAV networking functionalities are reconfigurable in real time and their performance can be easily measured. This feature can be systematically leveraged to perform an extensive UAV network performance data collection that is at the base of the data-driven optimization described herein.

The architectural integration between the DRL DPPS and CORE/EMANE is illustrated in FIG. 3. The same architecture is used in the learning engine 105 both by the virtual training environment and by the virtual testing environment. The integration between the DRL DPPS and CORE/EMANE implements the following three functionalities:

Data Communication

The MAC layer (Layer 2) implemented in the data plane 205 communicates with the Physical Layer (Layer 1) emulated in CORE/EMANE. This integration is bidirectional. It guarantees that the MAC Layer's data is passed down to the Physical Layer module in transmission, and that the CORE/EMANE's Physical Layer's data is passed up to the MAC layer in reception. These two operations are implemented through Python sockets which guarantee in-time data delivery and data integrity and happen simultaneously, in a transceiver fashion.

Network State Observation

Similar to the other layers, the network state information associated with the Physical and Motion layers emulated in CORE/EMANE is observable by the register plane 207. This information includes neighboring UAVs' locations and their transmission powers, for example. Different from the L2+ layers, L0, and L1 layers do not execute in the same binary as the register plane 207, and the information passing is thus implemented through CORE's Python APIs.

Motion and Network Parameters Control

Similarly, the control actions operated by the DRL plane must be relayed to the Physical and Motion layer emulated in EMANE. CORE's Python APIs were employed between the two environments for this task as well.

Figure 4:
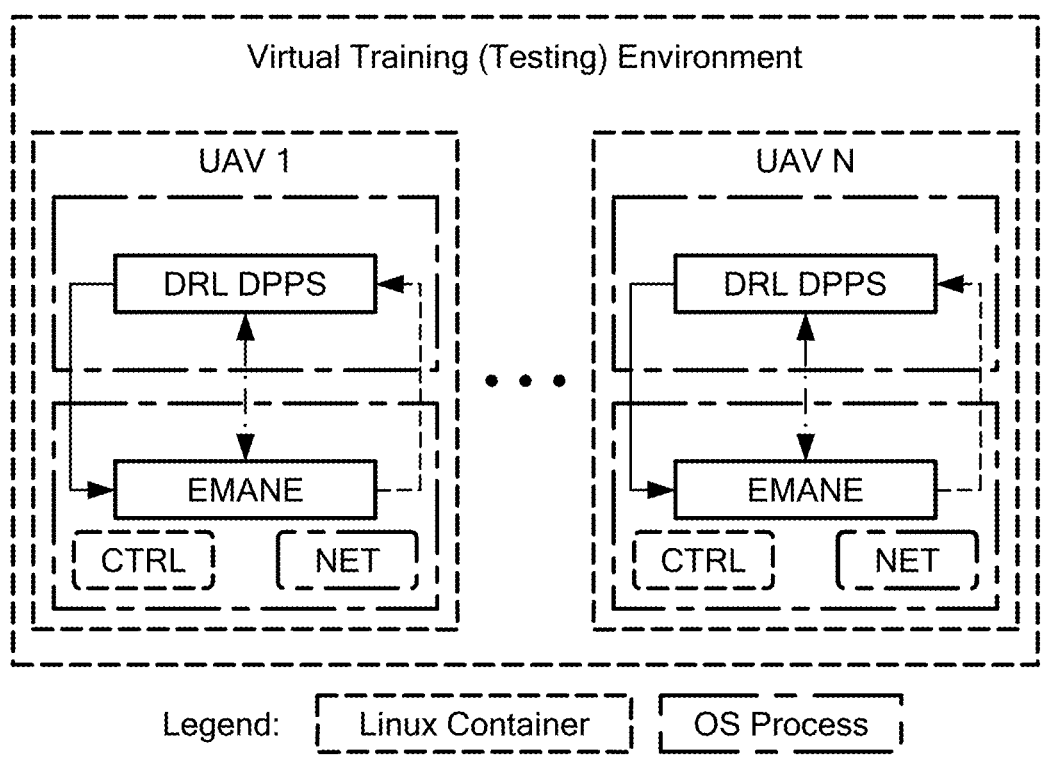
FIG. 4 is a schematic illustration of an embodiment of OS architecture of the virtual training environment.

From an Operating System (OS) architectural standpoint, Linux containers are employed to instantiate the virtual Training (and Testing) Environment, as well as the individual UAVs residing within the environment. An illustration of the OS architectural organization of the virtual UAV network is provided in FIG. 4. In the implementation, a nested container architecture is used where the virtual training environment is instantiated in a Linux docker container. This, in turn, hosts a set of Linux containers, i.e., the CORE containers (one per UAV). Each CORE container operates both the EMANE Motion and Physical layers and the DRL DPPS implementing MAC's and higher layers' functionalities. Once instantiated, nodes communicate with each other at the CORE level through the CORE Control Bridge and their CORE CTRL interface. At the EMANE level, nodes interact via the over the air (OTA) wireless channel through the NET EMANE interface as reported in FIG. 3. As per the individual UAVs, each CORE container creates one EMANE process and one DRL DPPS process. The two intra-container processes communicate with each other through Python sockets. Specifically, the data-flow streaming between MAC and Physical layer is handled through low-latency UDP sockets, while control and network state information are sent and retrieved through dedicated CORE's Python APIs to EMANE functionalities.

Background on Deep Reinforcement Learning

The following provides useful additional knowledge regarding the specific data-driven approach used in this technology to solve the problem of controlling a distributed UAV network.

DRL is a well-established data-driven approach with foundations in Reinforcement Learning (RL). The latter is a class of machine learning algorithms where an agent iteratively interacts with an environment to learn the optimal control policy that maximizes the desired reward. Different from supervised learning approaches, in RL the agent has no initial knowledge of which actions are more beneficial. Instead, this one explores the environment, tries several actions in different environment states, and eventually learns the best policy through experience. Some concepts and RL notations used herein are as follows:

- Agent: the entity that observes the environment and takes actions accordingly, aiming at maximizing a given reward function;
- Environment: the physical (or emulated) world with which the agent interacts;
- State space $S$: representing all of the possible states $s \in S$ of the environment;
- Action space $\mathcal{A}$: all feasible actions $a \in \mathcal{A}$ that can be taken by the agent;
- Reward r: a metric that measures the effectiveness and/or success of an action.

In RL, the goal of the agent is to maximize the discounted future reward by selecting actions according to the observed states from the environment.

$$R_t = \sum_{t'=t}^{T} \gamma^{t'-t} r_{t'}.$$

where $\gamma \in [0,1]$ is a discount factor used to weigh instantaneous and future rewards. One effective algorithm to maximize the discounted future reward and solve the policy optimization problem is Q-learning, where the agent is trained to compute a policy that results in the selection of the optimal action-value pairs that maximize the so-called Q-values. These represent the expected discounted future reward and are computed by using the following equation $$Q^*(s, a) = \max_{\pi} \mathbb{E}[R_t | s_t = s, a_t = a, \pi],$$

where $\pi: S \to \mathcal{A}$ is the policy that maps the observed state $s_t$ to selected action $a_t$. The optimal Q-values are computed by solving the Bellman's equation, and can be represented as $$Q^*(s, a) = \mathbb{E}_{s' \sim S}\left[r + \gamma \max_{a'} Q^*(s', a') | s, a\right],$$

where s' and a' are the state and action in the next time-step. Although in several cases it is possible to solve the Bellman's equation directly, the same task becomes challenging when dealing with a large number of states which usually leads to the so-called state explosion. That is, the state space $S$ is so large that the agent cannot explore all of it and solving the Bellman's equation becomes time-consuming. To overcome this issue, a typical approach entails approximating the Q-values rather than computing them directly. In DRL, this approximation is achieved by using a deep neural network (DNN) (well-known for being a universal function approximator) with weights $\theta$. Specifically, the Q-values in the Bellman's equation are estimated as $$Q(s, a; \theta) \approx Q^*(s, a).$$

and the DNN used to approximate the Q-values Q* is referred to as the Deep Q-network (DQN). The technology described herein can include the use of double-DQNs for autonomous control of UAV networks. In particular, this specific class of DQNs was considered as they are demonstrated to be effective in stabilizing the training phase and avoid over-estimations of the Q-values in the first stages of the training process. As discussed with reference to the ready-to-fly virtual environment, this is a critical aspect in data-driven optimization of UAV networks. To optimize its policy making, an agent stores experiences in the form of tuples (s, a, r, s') in a replay buffer. The buffer is used during the training phase to randomly extract batches of past experiences and use them to compute the DQN weights $\theta_M$ by minimizing the loss function via SGD.

$$L(\theta_M) = \left[r + \gamma \max_{a'} Q(s', a'; \theta_T)\right] - Q(s', a'; \theta_M)$$

In double-DQN, the decision making and the policy optimization are performed by two separate networks to prevent over- (or under-) estimations of Q-values. Specifically, a first DQN, called main network, is in charge of learning the Q-values at every iteration by updating the weights $\theta_M$ via SGD. A second DQN, called target network, is instead used to compute the actions to take, while its weights $\theta_T$ are periodically copied from the main network every $\tau$ training epochs (copy period). Moreover, consider an $\epsilon$-greedy strategy where the action taken by the DRL agent depends on the $\epsilon \in [0,1]$ parameter. Specifically, with probability $\epsilon$, the action taken by the agent corresponds to that computed by the DQN. Otherwise, it is randomly drawn from the action space $\mathcal{A}$ with probability $1-\epsilon$.

One of the possible extensions of DRL consists of considering multiple agents cooperating and interacting with each other to maximize a shared reward function. This class of problems is often referred to as multi-agent DRL and involves several agents independently interacting with a shared environment. In multi-agent DRL, each agent has a dedicated double-DQN which is updated according to their own experience of the environment. Although this class of problems has several variations (e.g., competitive agents, partial observability of the environment, heterogeneous rewards), in the technology provided herein, focus is on the case where all agents cooperate to maximize a shared reward in a distributed fashion.

UAV Network Control Problem as Multi-Agent DRL

The technology models the control problem of a Network Operator (NO) willing to dictate the behavior of a distributed network of UAVs as a multi-agent DRL employing the Q-learning techniques described herein. As discussed above, DRL provides a framework where a set of agents learn to react to changing environmental conditions by exchanging information, identifying the state of the environment, and adapting their policies to the current environment state. Similarly, the nodes of a distributed UAV network learn to react to the changing network conditions by recognizing the network state, exchanging information with their neighbors, and adapting their wireless networking and motion policies accordingly. As each UAV has full control of its motion and on-board wireless stack operations, each UAV is modeled as an independent agent in the DRL problem definition.

From a DRL perspective, the learning engine 105 constructs the virtual training environment based on the NO's input where:

1. each UAV is represented as an independent agent featuring the DRL DPPS described above, and interacting with the CORE/EMANE virtual environment as explained with reference to the ready-to-fly virtual environment;
2. the environment is represented by the multi-hop UAV network operations where source nodes generate data to be delivered to destination nodes while the rest of the network operates traffic forwarding tasks;
3. the agent's action space involves the control parameters specified by the NO spanning both networking and mobility domains. It is also worth noticing that in the considered multi-agent scenarios, different agents have different action spaces according to their role in the mission. For example, location-constrained UAVs feature a smaller action space as they can only adapt their networking parameters.
4. the state space is also discrete and defined as the set of values of the control parameters of the UAVs in the network (e.g., if this is the UAV's location only, the set of all UAV locations);
5. the reward is UAV network-wide and defined according to the network control objective specified by the NO. The agents are collaborative and all work to obtain the highest reward possible.

In the modeling, it is not assumed that the distributed agents have global knowledge about the environment and the state space. On the contrary, the agents (UAVs) can communicate with their neighbors or other UAVs belonging to the same multi-hop session. Therefore, UAVs can observe and share local state information only. In this way, the distributed UAV network control problem is modeled as a partially-observable multi-agent DRL problem.

Figure 5:
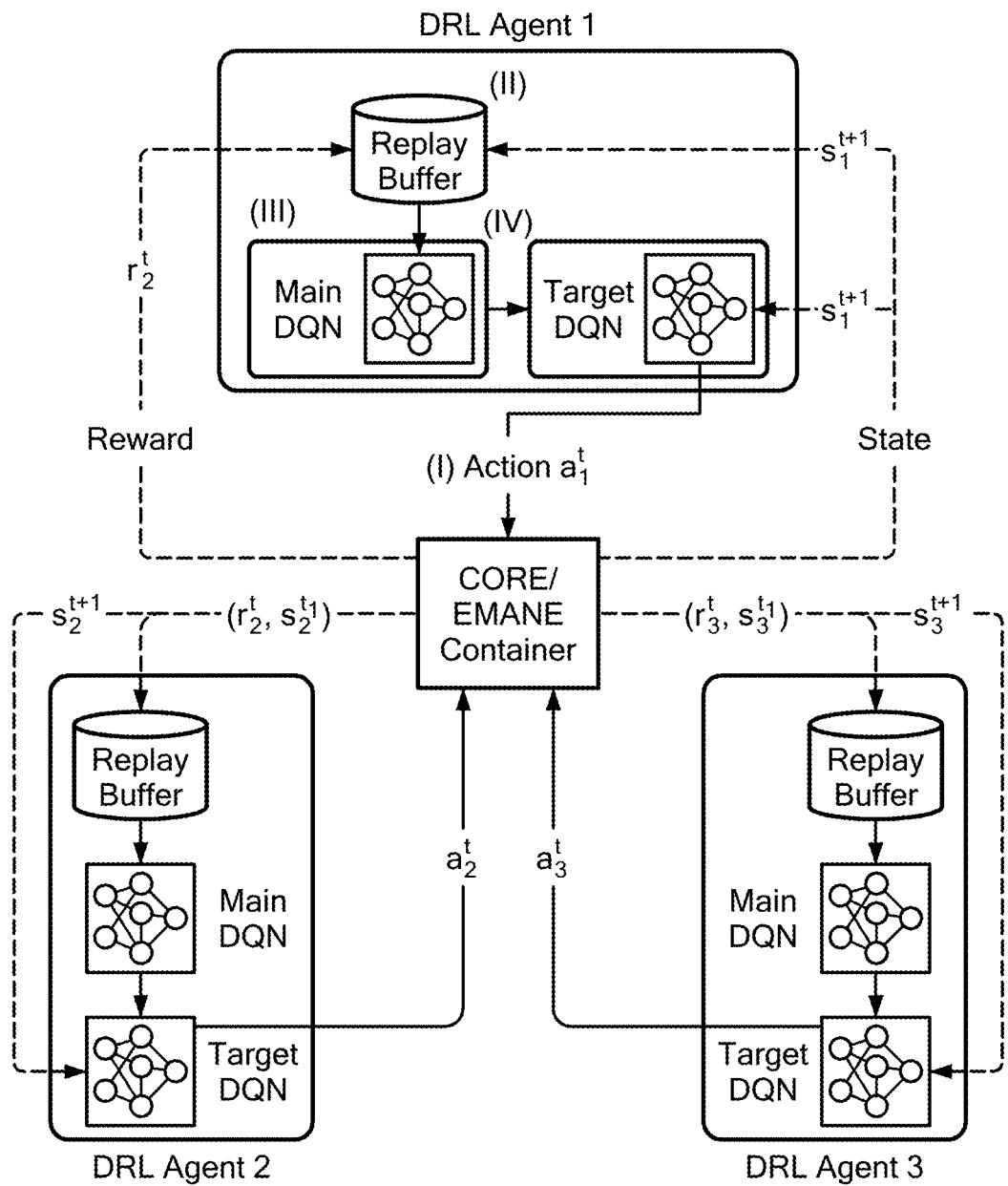
FIG. 5 is a schematic illustration of a multi-agent DRL representation of the UAV network control problem.

An illustration of the multi-agent DRL problem formulation is reported in FIG. 5. Upon receiving NO's input, the learning engine 105 instantiates a virtual representation of the UAV network scenario as described with reference to the ready-to-fly virtual environment where different UAVs interact with each other via the EMANE OTA Wireless Channel. This representation is used for the multi-agent DRL Training. In this phase, the agents iteratively explore the environment, and at each iteration $t \in \mathcal{T}$ they learn to adapt their policies to the environment to maximize the common utility function. At each given training step t, each DRL agent i observes the state $s_i^t$ and uses the target DQN in its DRL plane 203 (Step I) to independently take an action $a_i^t$. These decisions are made following the $\epsilon$-greedy strategy described with reference to the ready-to-fly virtual environment and are based on the observed network state at time t, i.e., $s_i^t$. It is worth recalling that each action can involve multiple control variables at several layers of the wireless stack and include the UAV's motion capabilities (e.g., change location and increase transmission power).

Upon taking action $a_i^t$, node i measures the network performance $r_i^t$ and the new network state $s_i^{t+1}$ (Step II). After each iteration, the tuple $(s_i^t, a_i^t, r_i^t, s_i^{t+1})$ is added to the replay buffer of agent i which is used to train the main DQN (Step III). Then, the weights of the main network are copied to the target DQN every $\tau$ iterations (Step IV). Within the DRL DPPS, the actions, observations, and rewards follow the logical flow described in connection with the DRL drone programmable protocol stack hereinabove, while agents sharing traffic or operating close-by share policy information at every step t.

In conclusion, by training the multi-agent DRL representation of the UAV network, the agents learn how to adapt their policies to maximize the UAV network performance dictated by the NO in a distributed fashion. The training procedure terminates when the DQN converges and the loss function plateaus to a constant value (or no further improvements are observed). Finally, the trained neural network configurations 150 are evaluated in virtual testing environment to assess their performance and are ready to be dispatched.

Provided here is an example of how the NO's directives (e.g., the example directive provided above) are formulated into a multi-agent DRL problem by the Training Engine. Six agents (i=1, 2, . . . , 6) are instantiated in the virtual environment which also implements the fielding location and wireless scenario in EMANE. Each agent features a DRL DPPS and interacts with the other agents over EMANE's OTA wireless channel. Following the NO's directives, the agents control each UAV's location in space and Physical layer TX power. Consider a discrete action space $\mathcal{A} = \mathcal{L}0 \times \mathcal{L}1$, where $\mathcal{L} = \{N, E, S, W, U, D,\}$ represents the six possible directions (i.e., the cardinal points, up, and down) each UAV can select as well as a 'stay put' action, and $\mathcal{L}1 = \{-1,1\}$ represents a step decrease, maintain, and a step increase of the wireless transmission power, respectively. Four of the agents are location-constrained, which means that their NN will not perform location policy optimization (i.e., $\mathcal{A}=\emptyset \times \mathcal{L}1=\mathcal{L}1$) and the two traffic patterns are specified as flowing from node 1 to node 3 and from node 4 to node 6. Accordingly, the state space of the environment is defined as $\mathcal{S}=\mathcal{S}_1 \times \mathcal{S}_2 \times \ldots \times \mathcal{S}_6$, where $\mathcal{S}_i$ represents the location and transmission power of agent i. At each step t of the training, the agents operate as follows:

- the NN of each agent i operates policy optimization for the UAV's location in space and transmission power by taking action $a_i^t = \{LOC_i^t, TX\_POW_i^t\}$ if location unconstrained, $a_i^t = \{TX\_POW_i^t\}$ otherwise;
- the register plane 207 collects observations from the virtual environment in the form of state and reward;
- the agent measures the received reward $r_i^t$ and observes the new state $s_i^{t+1}$;
- the experience $(s_i^t, a_i^t, r_i^t, s_i^{t+1})$ is stored in the Replay Buffer and will be used to minimize the loss function in of the main DQN via SGD;
- the new state $s_i^{t+1}$ is used by the target DQN to compute the next action $a_i^{t+1}$;
- every $\tau$ training iterations, the knowledge of the main DQN gets transferred to the target DQN.

Scalability and Robustness Against Stochastic Effects

Different from other wireless applications (RAN, Wi-Fi, etc.), measuring the network-wide performance of an infrastructure-less wireless network presents some unique challenges, including, for example, the following.

Slow Start

Due to the multi-hop nature of UAV networks, the first-time instants after instantiating the network might be characterized by the lack of transmission activities in some parts of the network. Indeed, to relay data to the next hop, some nodes must first wait to receive packets from previous hops. However, due to transmission and processing latency introduced by multi-hop relaying, packets generated at source nodes are not immediately available at intermediate nodes. This generates a transient phase where not all nodes of the network are operative at once and performance measurements might fluctuate significantly. Thus, testing the performance of a multi-hop wireless network at regime asks for a measurement period longer than the transient phase.

Slow Transitions

Differently from fixed-backhaul wireless networks and single-hop wireless systems, infrastructure-less wireless networks maintain memory of previous states and network parameters' configurations. For example, the effect of a single control action (e.g., a change in UAV's location and TX power) on a high-level network performance metric (e.g., end-to-end network throughput) is not immediately measurable. In addition, the traffic needs to propagate through the whole network before the performance can stabilize to the new network configuration. Accordingly, performance measurements need to be long enough to allow the network performance to stabilize to the new configuration.

Stochastic Performance Metrics

Figure 6:
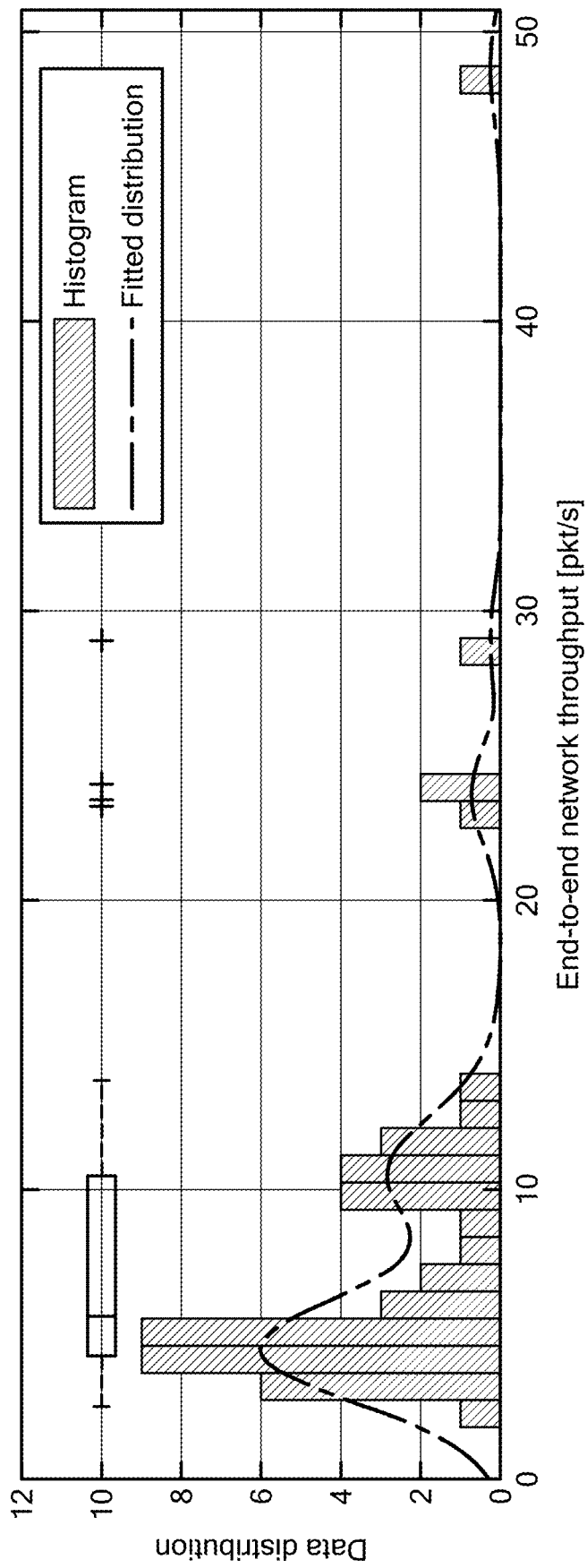
FIG. 6 is a graph of performance data distribution for 50 experiments on a 6-UAV network.

When measuring high-layer performance metrics such as end-to-end throughput on a multi-hop wireless network, one might notice a stochastic behavior of the measured performance. This is caused by the stochastic nature of the wireless channel, medium access techniques, data availability, and—more generally—lower layer protocol stack operations. This effect is exacerbated by the number of wireless hops the end-to-end data flow traverses. The data distribution of the end-to-end throughput (measured in packets per second) for a 6-UAV network and 50 identical-configuration runs is reported in FIG. 6. It reports an average of 40 pkts/s with variance equal to 68 as well as large outliers (in the order of 200 pkts/s). To obtain a representative performance measure of a given network configuration, it is therefore important to perform measures in batch and average out the outliers.

These aspects combined pose severe challenges to the collection of extensive and representative performance data which is at the foundation of any data-driven approach. If left unaddressed, these issues result in excessively long data collection periods, even when performed in a virtual training environment.

To overcome the above issues, a training pipeline is provided that implements parallelization and outlier suppression. To collect the performance metric of a given network configuration, issue Slow Start imposes a measurement time long enough to allow nodes relaying traffic to receive data. Indeed, such measurement time can be evaluated in the virtual environment per individual network fielding. For example, the duration of such an interval has been measured to be 5 seconds for network instances with less than 20 UAVs. As mentioned before, the emulation environment aims at mimicking an actual UAV fielding and, thus, executes in real time. This means that 1 second in the emulated environment corresponds to 1 second in the real world. To address the long training time resulting from this feature, the 'ready-to-fly virtual environment is designed to execute a set of K emulated environments in parallel, each running on a dedicated Linux docker container. By instantiating K independent parallel environments, the agents perform K actions. Therefore, they collect K rewards and K observations, this way generating K times more performance data than single-container executions effectively cutting the exploration time by a factor K. These parallel environments are non-identical and evolve independently over the iterations $\mathcal{T}$, thus representing K independent learning threads for the agents. To tackle issue Slow Start, the reconfiguration capabilities of the virtual emulation environment 111 are leveraged and the network state is reset upon any action. In this way, any residual memory of previous network configurations can be removed, and it is possible to assess uniquely the performance of the actions taken at a given time instant with no memory of the previous ones.

Figure 7:
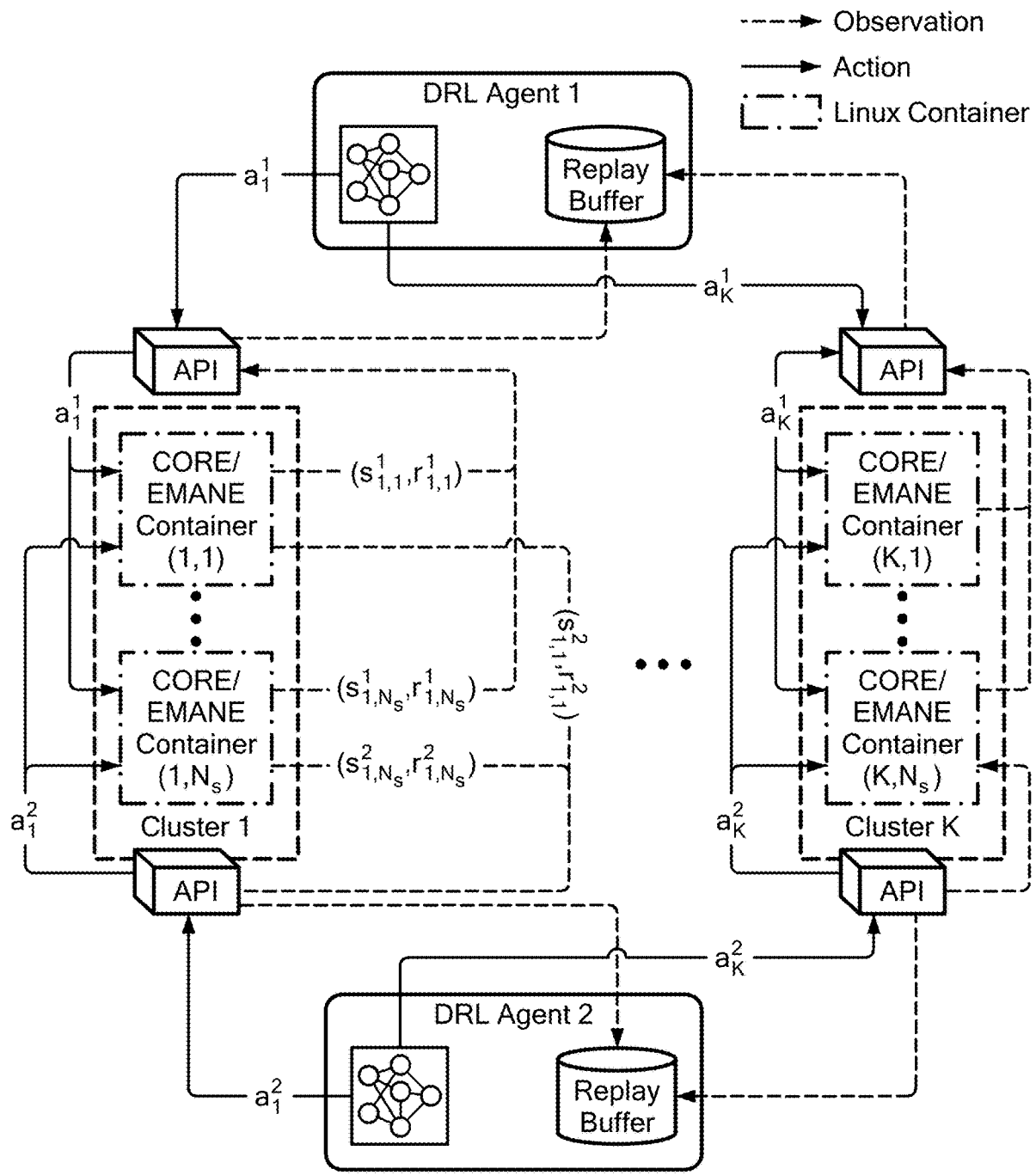
FIG. 7 is a schematic illustration of an embodiment of an architectural design of parallel training.

While parallel executions speed up the training time by a factor K they are not sufficient to address issue Stochastic Performance which causes metric outliers that could result in overestimation (or underestimation) of Q-values and affect the learning performance of the DRL agents. To alleviate this problem, parallel virtual executions are leveraged again by instantiating clusters of $N_S$ environments for each of the K containers, for a total of $N_S \times K$ parallel environments as shown in FIG. 7. Within each cluster, the instantiated environments are identical copies of each other (i.e., they share the same RF conditions, topology, and network parameters), and are used to compute average performance metrics that mitigate the impact of outliers. As shown in FIG. 7, the framework is designed to combine the rewards coming from each cluster and to remove outliers which stabilizes the training procedure (i.e., the approximation of the Q-values). Architecturally, each environment is instantiated through a Linux docker container. The 'ready-to-fly virtual environment implementation thus employs $N_S \times K \times |agents|$ Linux containers executing in parallel. This feature is paramount to ensure scalability with respect to the number of agents, states, and actions, which could severely prolong the training phase. Indeed, the parallel training architecture allows the exploration of K environment instances at once. This results in faster exploration time and provides a scalable training approach for DRL-based solutions.

Thus, the described 'ready-to-fly' virtual environment architecture allows the performance of an extensive and representative experimental data collection for multi-hop UAV networks without compromising the duration of the training provided herein.

Evaluation

The performance of the DRL-based optimization was tested on a series of fielding scenarios and control objectives. Reported here is the testing performance of the trained DRL agents as measured in the virtual testing environment. Specifically, the following three control schemes were considered.

No Control (NC)

In this case, all UAVs operate under static network and motion parameters. They use the initial fielding location and wireless networking parameters without optimizing them throughout the experiments. No Control is a non-optimized control scheme and serves as a baseline for evaluation.

Best Response (BR)

UAVs optimize their motion and wireless networking parameters individually with neither cooperation with other nodes nor considering the cross-layer coupling between protocol stack variables. For example, under this control scheme, UAV location and transmission power are optimized individually without considering the effects of these decisions on the performance of other protocol layers or nodes on the channel. This approach has proved to be limiting in wireless networked systems and serves as a second baseline in evaluation.

Deep-Reinforcement Learning (DRL)

This is the approach described in connection with the technology provided herein. In DRL, each UAV is controlled by an individual DRL agent that uses a pre-trained NN to implement cross-layer motion and networking policy optimization. Furthermore, different agents exchange information with one another in a coordinated yet distributed fashion.

For each UAV network configuration, the performance of the aforementioned three control schemes was evaluated over 100 different initial UAV fielding configurations. Moreover, for each fielding, 10 independent runs were performed, and the average performance results upon convergence of the agents to a stable operational point was reported.

Experimental Configuration

In all of the experiments, UDP transport layer protocol with 256 Byte long packets, single-path routing scheme, and frequency division multiplexing MAC was considered. At the Physical layer, wireless communications occur in the 2.4 GHz ISM band with operational bandwidth of 1 MHz. From a DRL optimization perspective, optimization intervals t of 5 seconds and Physical layer's TX power step size of 5 dBm were considered, and the UAVs' relocation range was constrained to a 40 000 $m^2$ box with step size equal to 20 meters, unless otherwise specified. As RF antennas employed for UAV communications are usually dipole modules mounted on the upper side of the main frame, only UAV mobility on the latitude and longitude planes was considered. This allows the simplification of the emulated signal propagation patterns and avoid modeling frame shadowing, blockage, and reflection effects which incur when wireless UAV fly at different altitudes.

Effectiveness

The analysis was started by assessing the effectiveness of the DRL-based control scheme provided herein in addressing the control problem defined above. First, the performance of the network was assessed when the two relays are allowed to control their location only. The average performance results for NC, BR, and DRL when employing only UAV's location control (DRL LOC) are reported in FIG. 6. At the top of the figure is shown the cumulative distribution function (CDF) of the measured end-to-end network throughput, i.e., the objective function specified by the NO, for different control schemes. The box-plots in the bottom part of the figure instead report the average values of those experiments. The DRL-based control outperforms NC and BR, achieving 1.8× and 3.3× better performance.

Flexibility

Figure 8A:
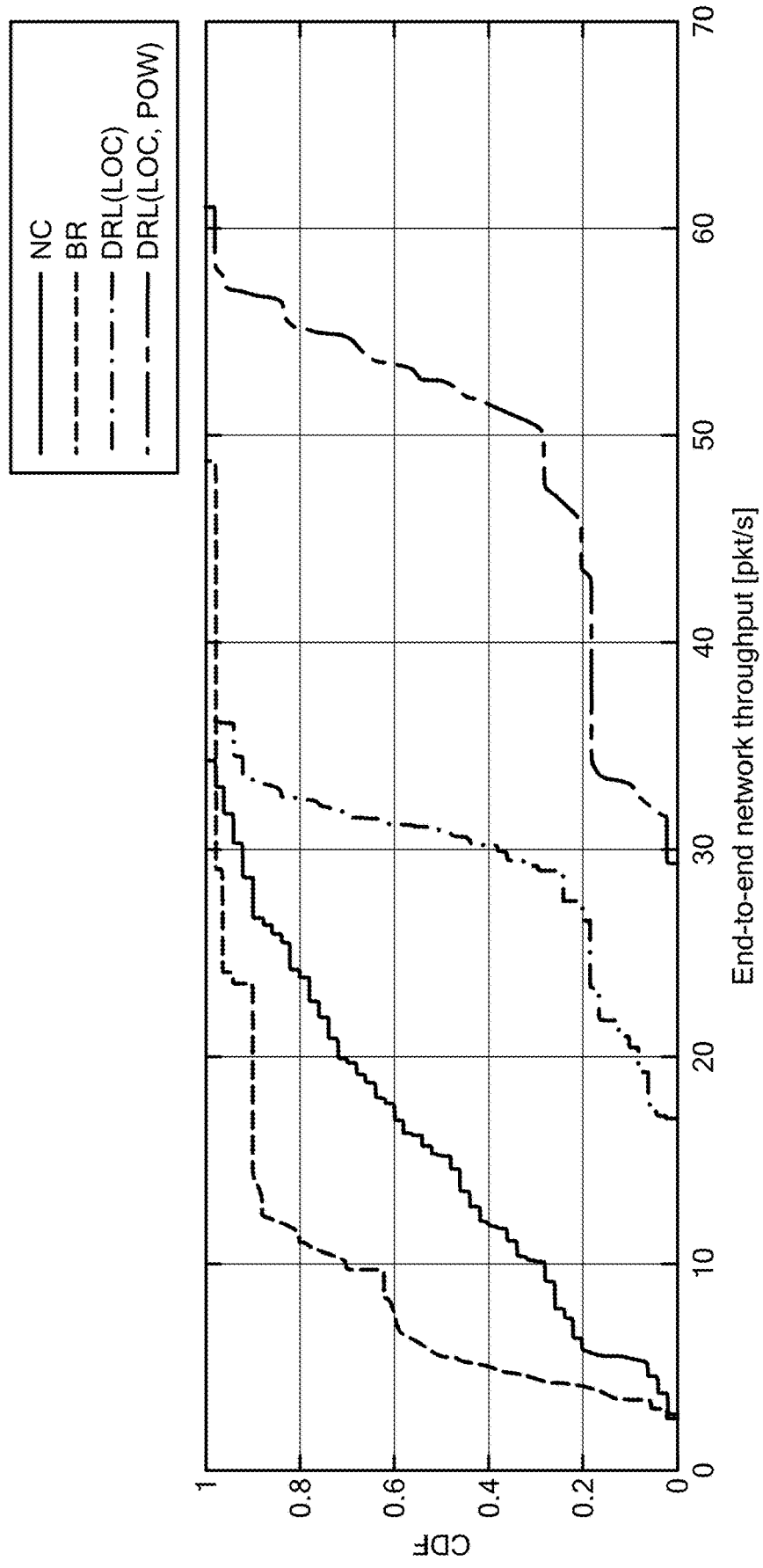
FIG. 8A is a graph of cumulative distribution function of measured end-to-end network throughput for different control schemes over 100 experiments on a 6-UAV network.
Figure 8B:
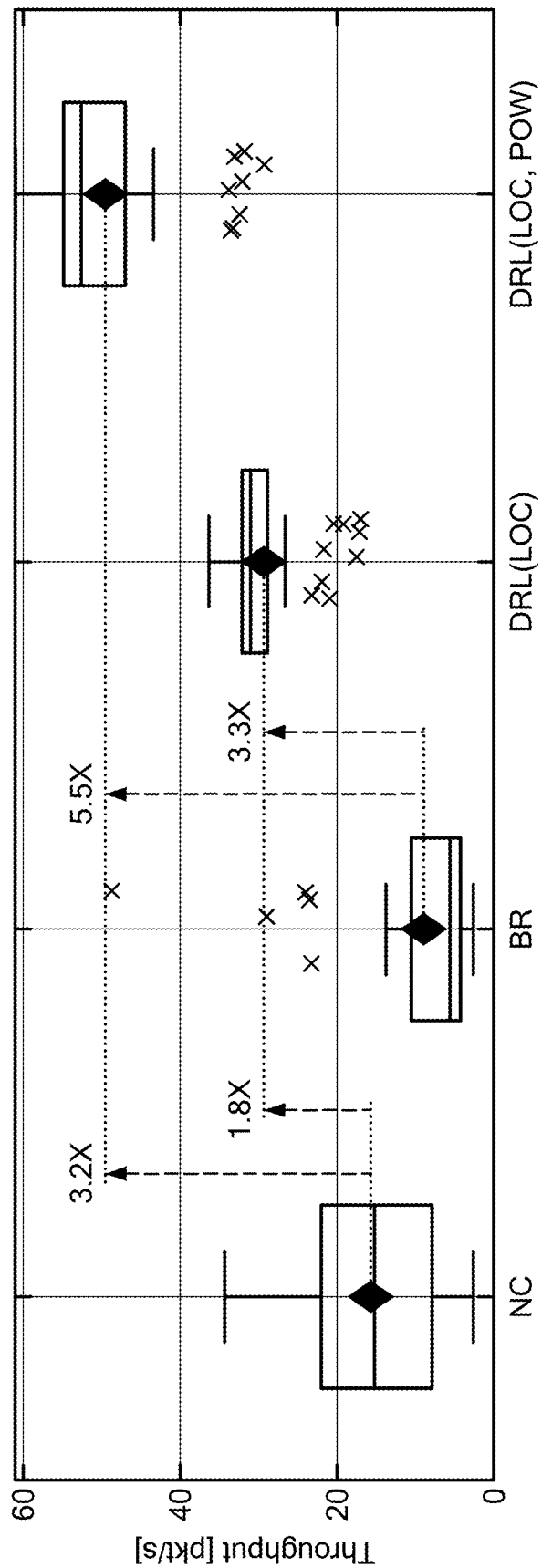
FIG. 8B is a graph of average performance results for Max-sum-throughput for different control schemes over 100 experiments on a 6-UAV network.

It was analyzed how the optimization performance changed when the degrees of freedom of the DRL agent were increased by extending the control action space. Thanks to the flexibility of the framework, the NO can select among a wide number of UAV control parameters and this evaluation can be easily carries out. The control parameters were extended to include UAVs' Physical layer TX power together with UAVs' location. The performance of this new control problem is reported in FIGS. 8A-8B. Over 100 testing experiments, the DRL-based control overcomes NC and BR, achieving 3.2× and 5.5× end-to-end network throughput. By extending the range of controls each agent can leverage, a degree of freedom is added to the solution space. This resulted in a better optimal operational point for the UAV network which reports an increase in performance of 1.7× on the case with location control only.

Figure 9A:
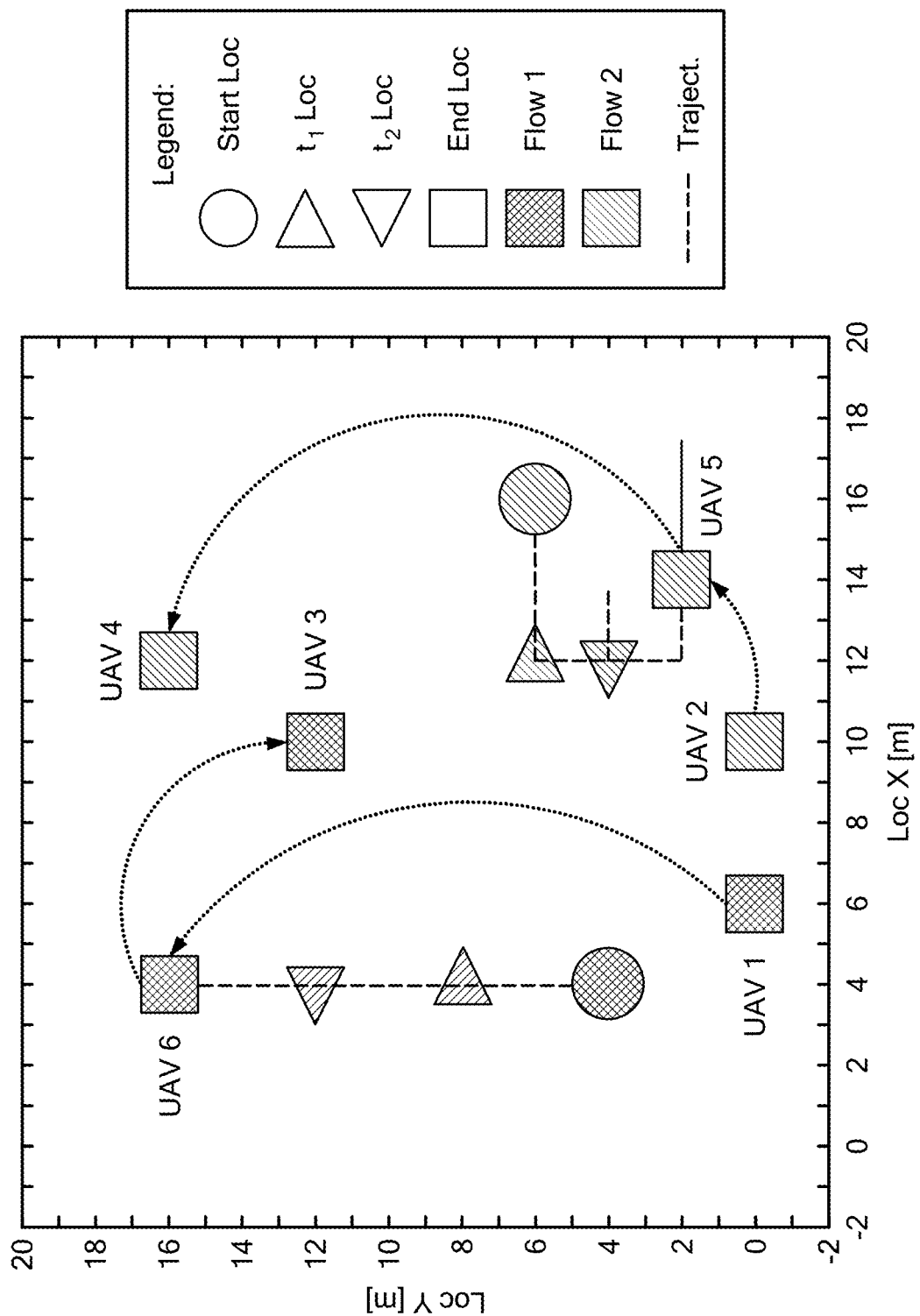
FIG. 9A is a plot of location over time of UAVs in a 6-UAV network in accordance with various embodiments.
Figure 9C:
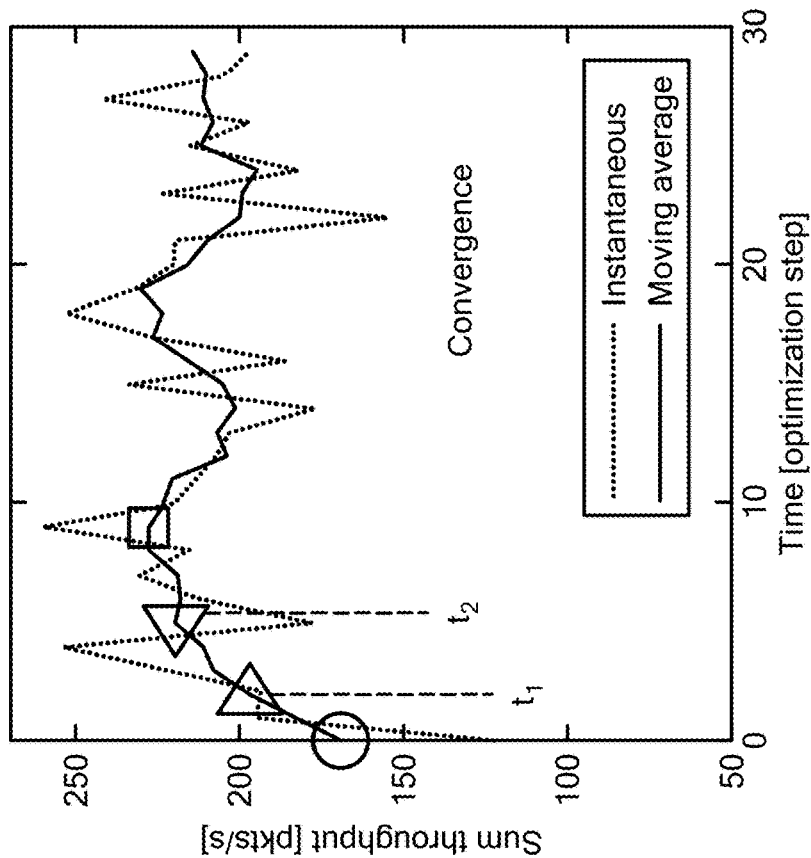
FIG. 9C is a graph of Max-sum-throughput for a single-run experiment on the 6-UAV network of FIGS. 9A and 9B.
Figure 9B:
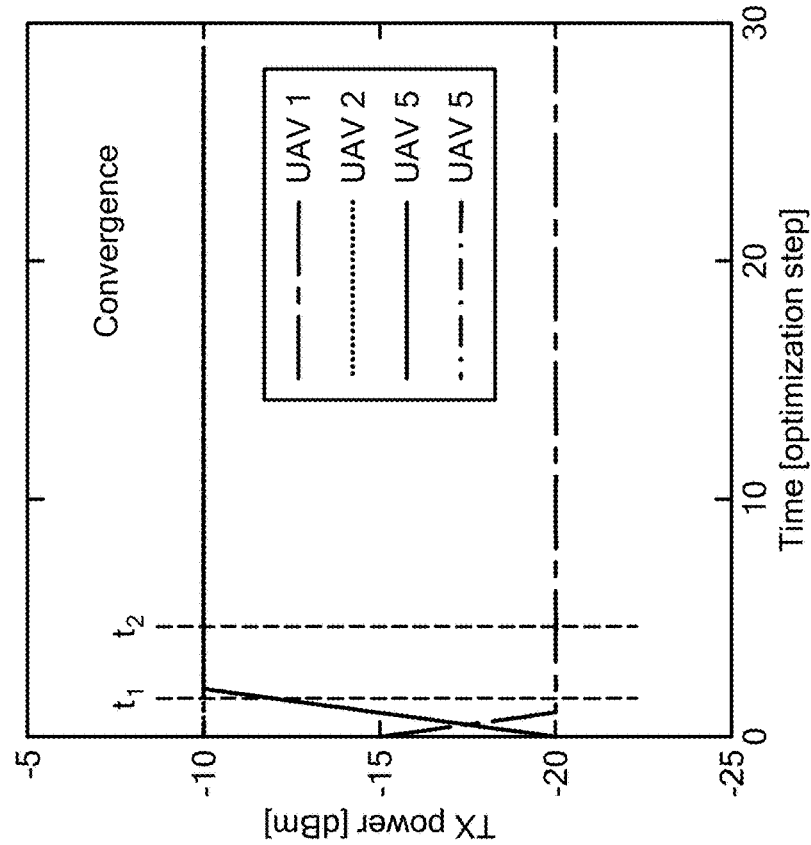
FIG. 9B is a graph of transmission power over time of the UAVs in the 6-UAV network of FIG. 9A.

FIGS. 9A-9C illustrate the DRL optimization convergence dynamics for a single experiment for the network scenario in the example directive above and processed in control interface Listing 1. FIGS. 9A and 9B show the UAVs' location and UAVs' TX power over time, respectively. FIG. 9C reports the performance metric for this experiment, that is, the sum of the two end-to-end sessions' throughput. From the top part of the figure, it can be noticed how the UAVs' locations are optimized by the DRL agents and go unchanged after the 10-th iteration, while, from the bottom-left part of the figure, it can be noticed that the TX Powers already stabilized at the 4-th iteration. When the UAVs' parameters operational points stabilize, the UAV network can be deemed to have reached convergence and have achieved the NO's desired behavior (apart from small fluctuations at regime due to the stochastic nature of the wireless environment).

Scalability

Figure 10B:
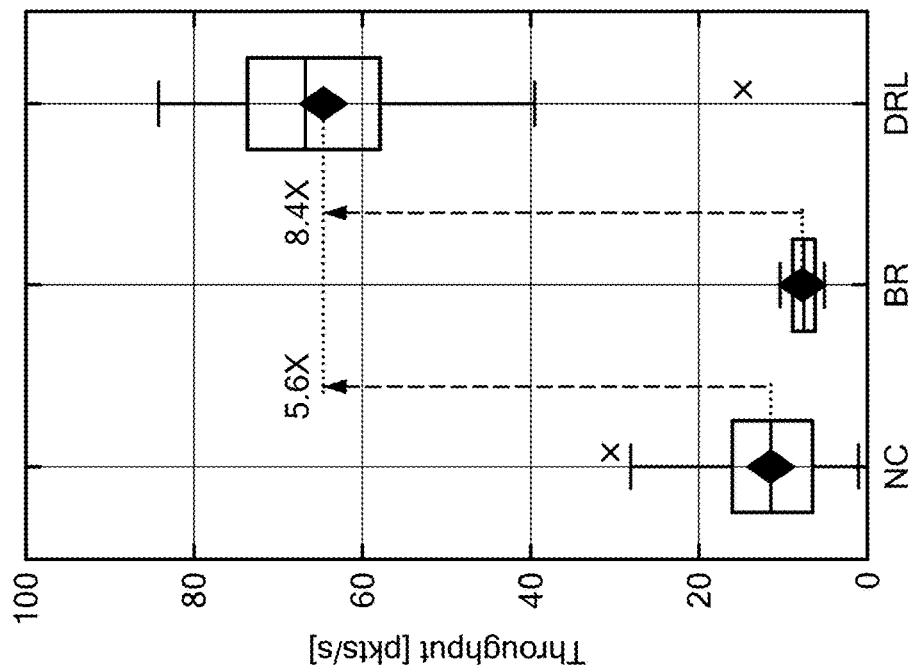
FIG. 10B is a graph of average performance results for Max-sum-throughput for different control schemes over 100 experiments on an 8-UAV network.
Figure 10A:
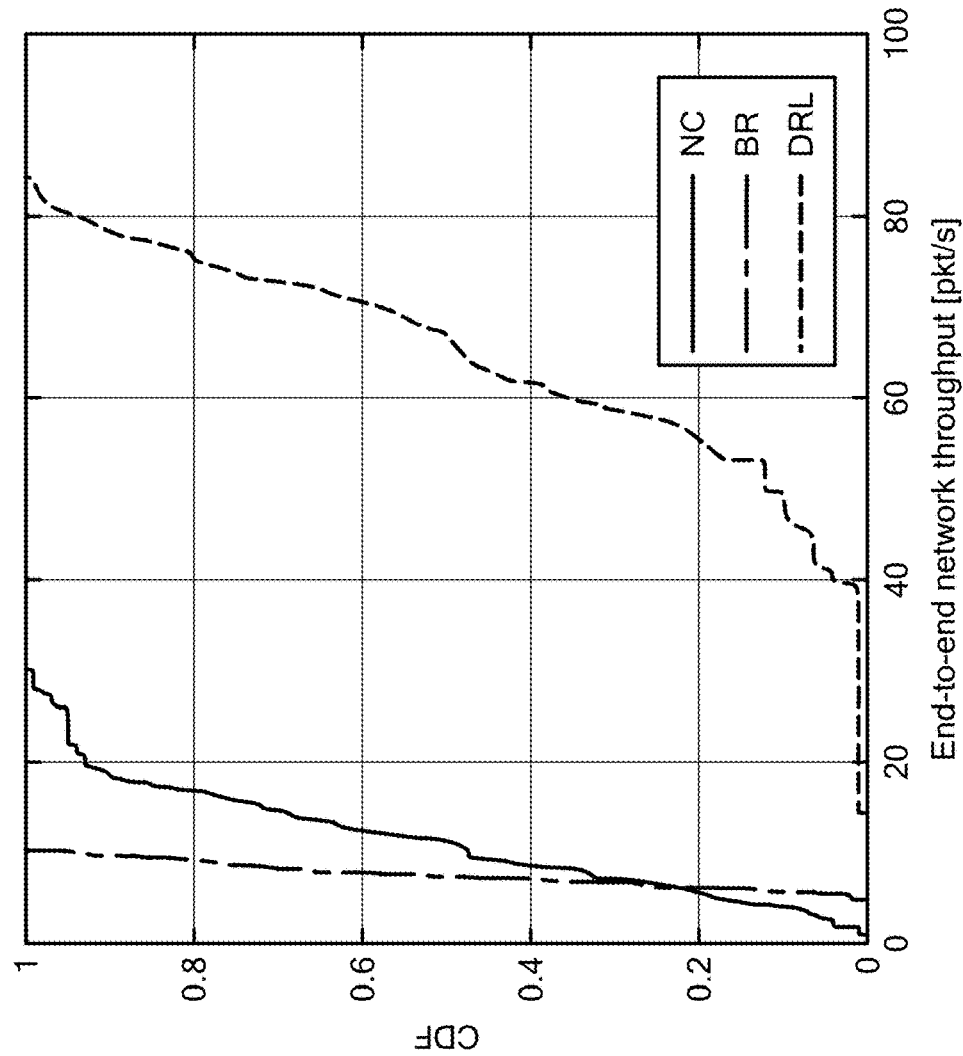
FIG. 10A is a graph of cumulative distribution function of measured end-to-end network throughput for different control schemes over 100 experiments on an 8-UAV network.

Here the scalability performance of the data-driven optimization approach is assessed on larger-scale scenarios than that considered in the example directive above. FIGS. 10A-10B report the optimization performance for an 8-UAV network with 2 sensing areas and 2 report areas (control objective is again to maximize the sum of the two end-to-end sessions' throughput and the controls are again UAVs' locations and TX power). For this mission, 4 UAVs are tied to sensing and reporting tasks and are location-constrained, while the remaining 4 UAVs are free to move and operate as traffic relays to support multi-hop communications. Over 100 testing experiments, DRL outperforms NC and BR by 5.6× and 8.4×.

Figure 11B:
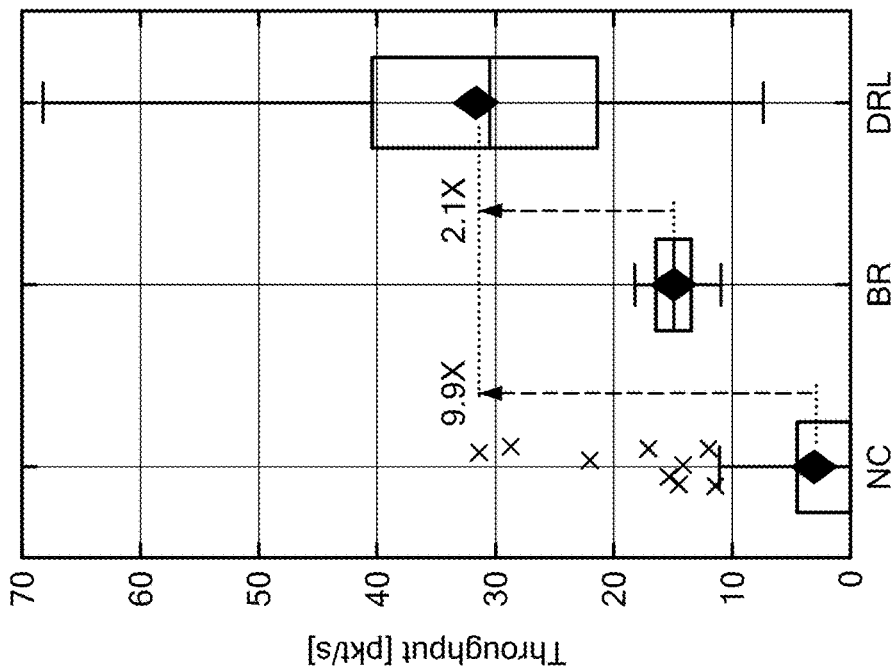
FIG. 11B is a graph of average performance results for Max-sum-throughput for different control schemes over 100 experiments on a 12-UAV network.
Figure 11A:
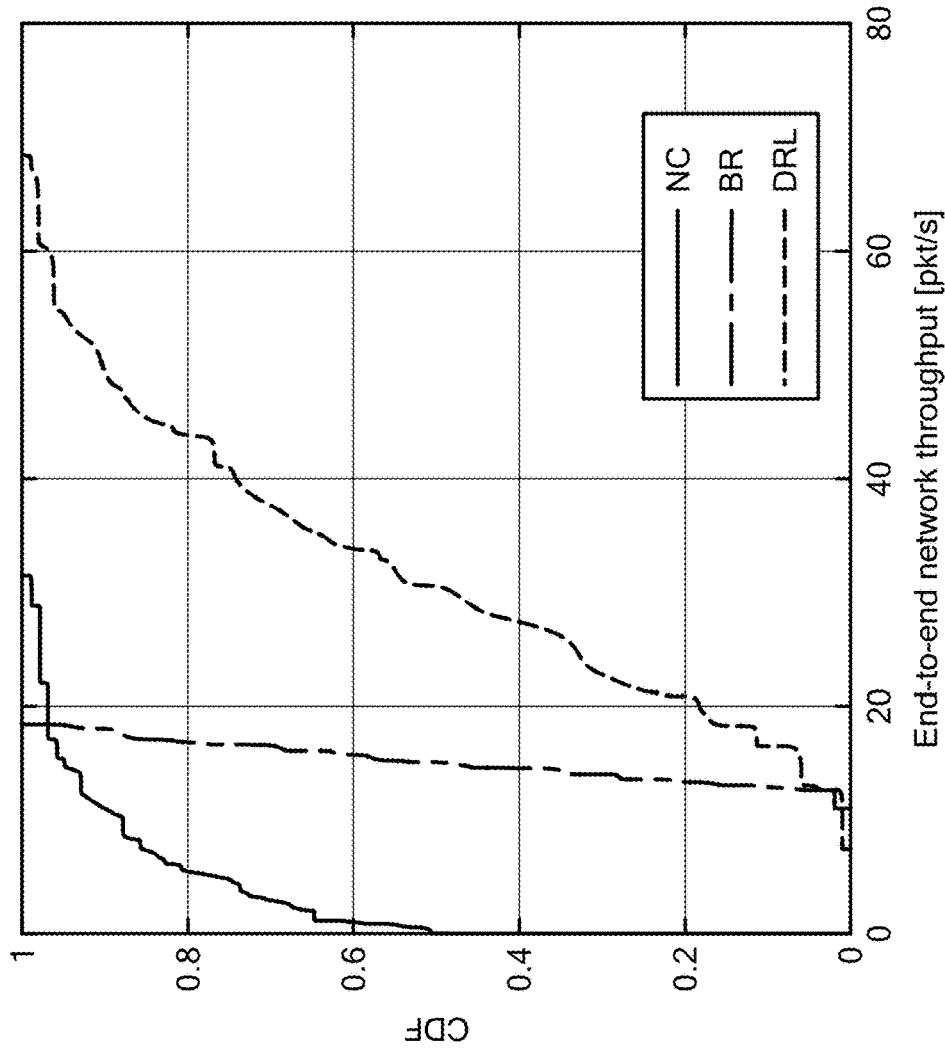
FIG. 11A is a graph of cumulative distribution function of measured end-to-end network throughput for different control schemes over 100 experiments on a 12-UAV network.

The performance of the optimization was assessed on another test experiment with 12 UAVs, 3 sensing areas, and 3 report areas; keeping control objective and controls unchanged. This time, 6 nodes were location-constrained while the remaining 6 operated as relays. For this experiment the UAVs' relocation range was constrained to a 90 000 m² box. The performance results are reported in FIGS. 11A-11B. In this test, DRL performed 9.9× and 2.1× better than NC and BR, respectively (measures averaged over 100 experiments).

Figure 12B:
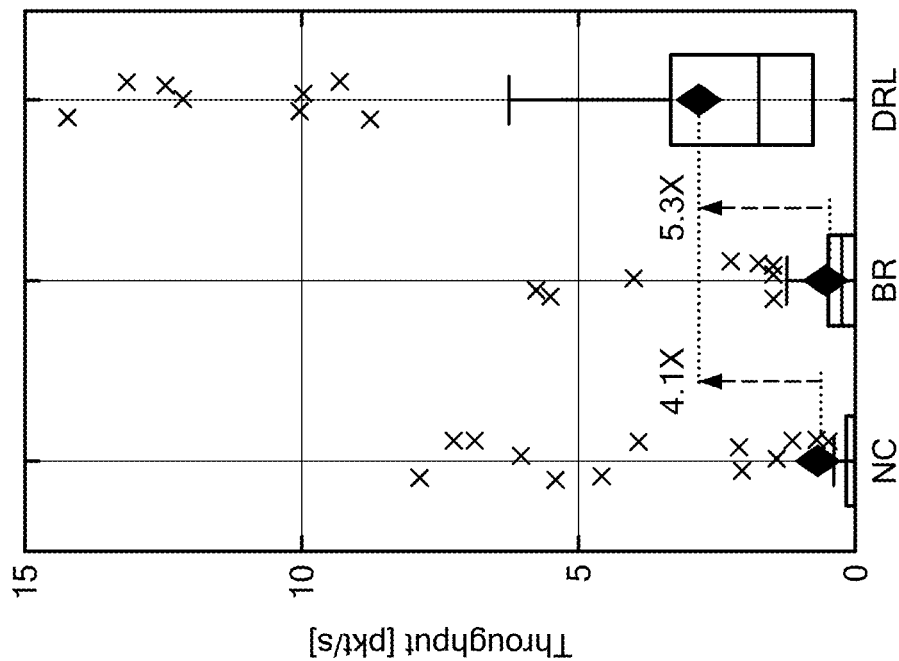
FIG. 12B is a graph of average performance results for Max-sum-throughput for different control schemes over 100 experiments on a 20-UAV network.
Figure 12A:
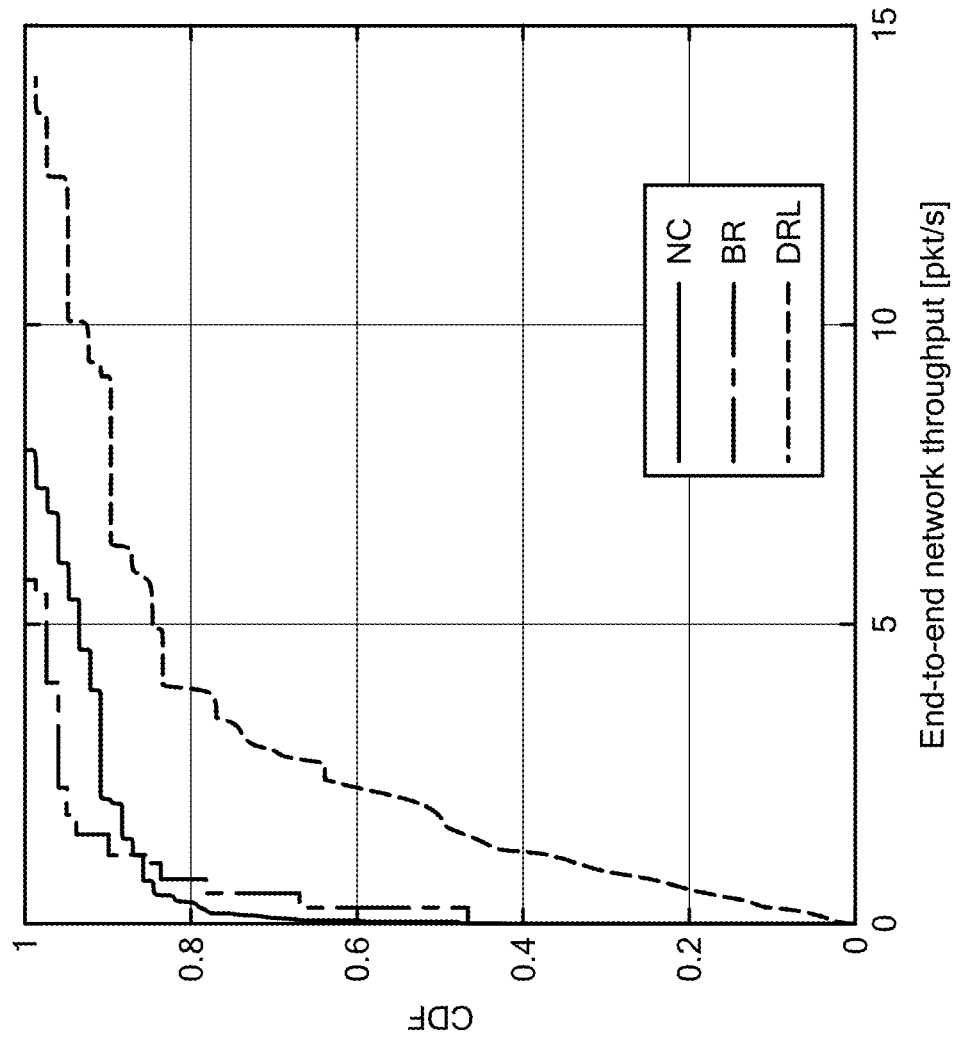
FIG. 12A is a graph of cumulative distribution function of measured end-to-end network throughput for different control schemes over 100 experiments on a 20-UAV network.
Figure 13B:
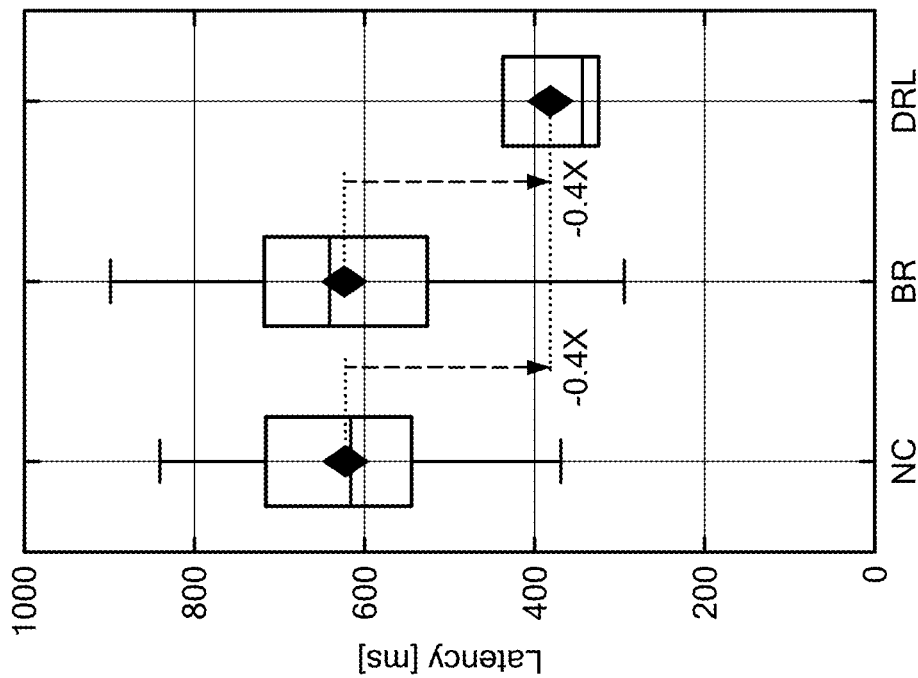
FIG. 13B is a graph of average performance results for Min-average-latency for different control schemes over 100 experiments on a 6-UAV network.
Figure 13A:
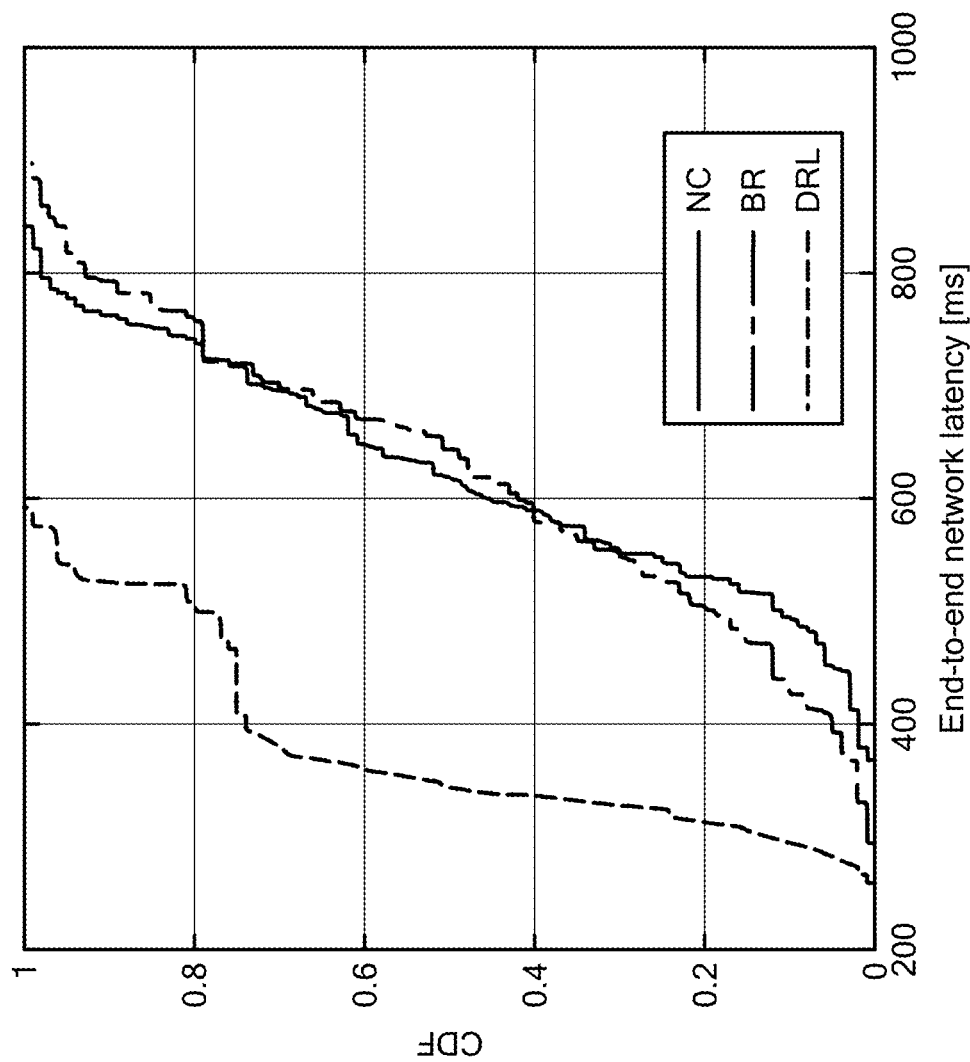
FIG. 13A is a graph of cumulative distribution function of measured end-to-end network latency for different control schemes over 100 experiments on a 6-UAV network.
Figure 14B:
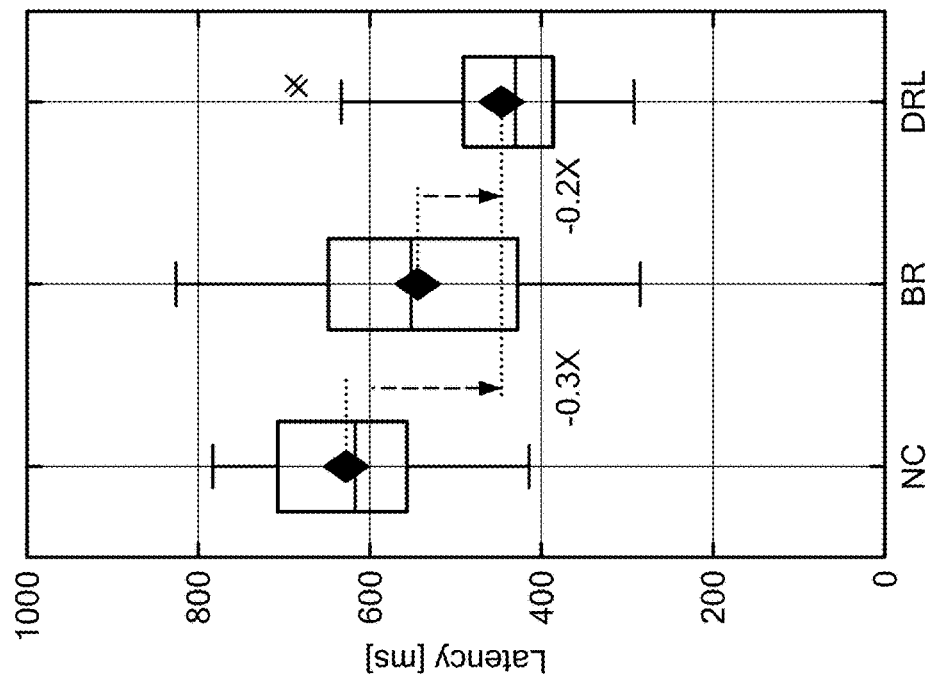
FIG. 14B is a graph of average performance results for Min-average-latency for different control schemes over 100 experiments on an 8-UAV network.
Figure 14A:
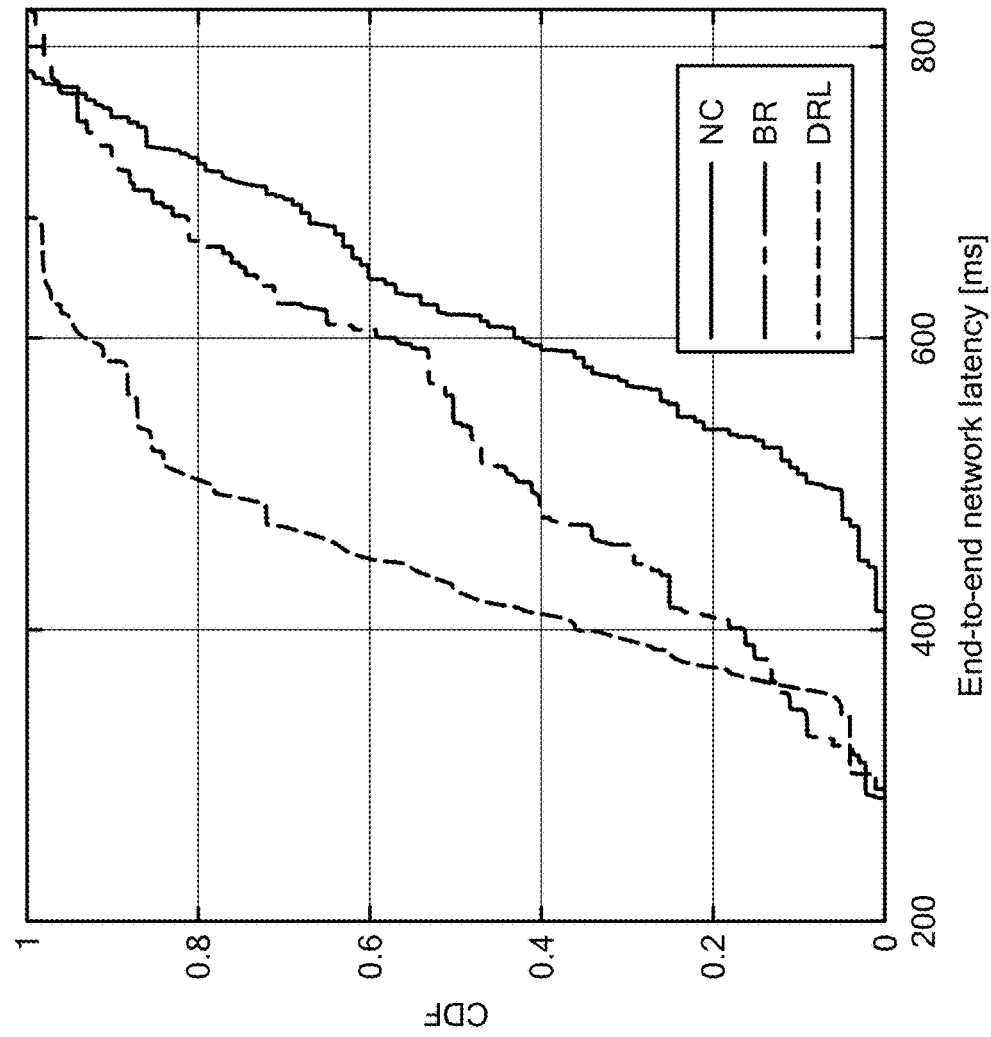
FIG. 14A is a graph of cumulative distribution function of measured end-to-end network latency for different control schemes over 100 experiments on an 8-UAV network.

Last, the solution was tested on a complex scenario with 5 sensing areas, 5 report areas, and a total of 20 UAVs. This larger-scale scenario was characterized by strong interference due to the higher number of nodes. Therefore, to achieve the NO's intent, combating interference via efficient network control became a paramount task. The results reported in FIGS. 12A-12B indicate that, without optimization, the harsh interference conditions impaired basic communication procedures. Indeed, under NC and BR control schemes, the network operated at less than a packet per second. Nonetheless, the DRL-based optimization proved its effectiveness even in complex, interference-prone scenarios that are hard to optimize. DRL reports throughput of 3 packets per second with gains of 4.1× and 5.3× over NC and BR, respectively.

In conclusion, DRL improved the performance of the UAV network by an average 3.7× with respect to the second-best performer.

Reconfigurability

As discussed in connection with the control framework, the described control architecture facilitates network reconfigurability and can be employed to reconfigure the UAV network to achieve several network control objectives. To achieve different desired network behaviors, the NO only needs to change the desired control objective through the control interface 103 (e.g., modify the objective on Line 26 in control interface Listing 1 while the described control framework 101 takes care of generating and dispatching the new neural network configurations 150 over the wireless interface. In the following, the programmability features of the described control approach are demonstrated by measuring the performance of data-driven optimization for a new control objective. The performance of the 6-UAV and 8-UAV networks described above is assessed for the min-average-latency control objective, which aims at minimizing the average end-to-end latency across the UAV network's sessions (i.e., from sources to destinations). The average testing results for 100 experiments are reported in FIGS. 13A-13B and FIGS. 14A-14B for the two UAV networks, respectively.

For this new control objective, the DRL-based optimization reported an average end-to-end latency reduction of 0.4×, and 0.2× over the second-best performer for the two UAV networks, respectively.

Data-Driven Optimization vs Convex Optimization

Figure 15B:
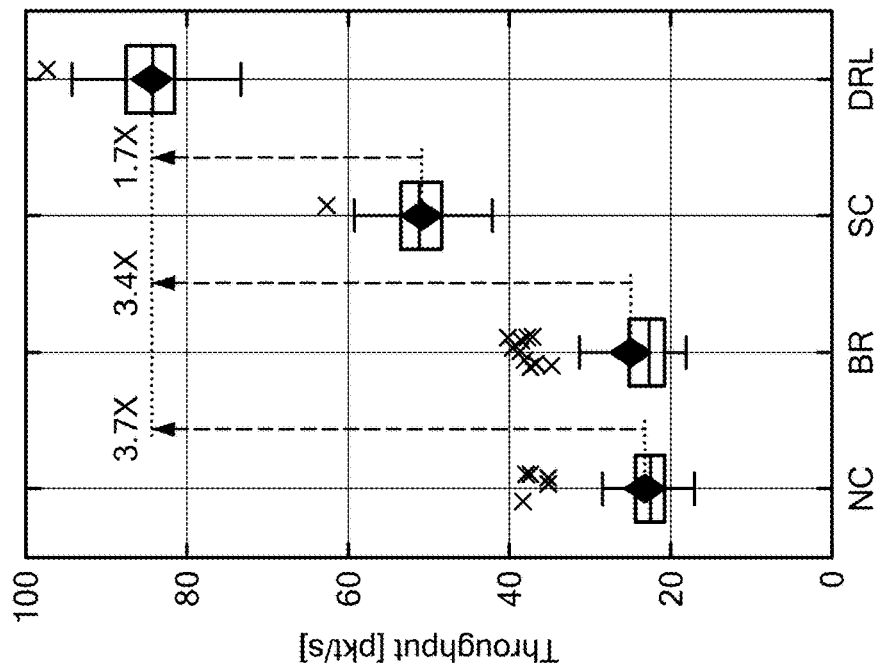
FIG. 15B is a graph of average performance results for Max-sum-throughput for different control schemes, including SC, over 100 experiments on an 8-UAV network.
Figure 15A:
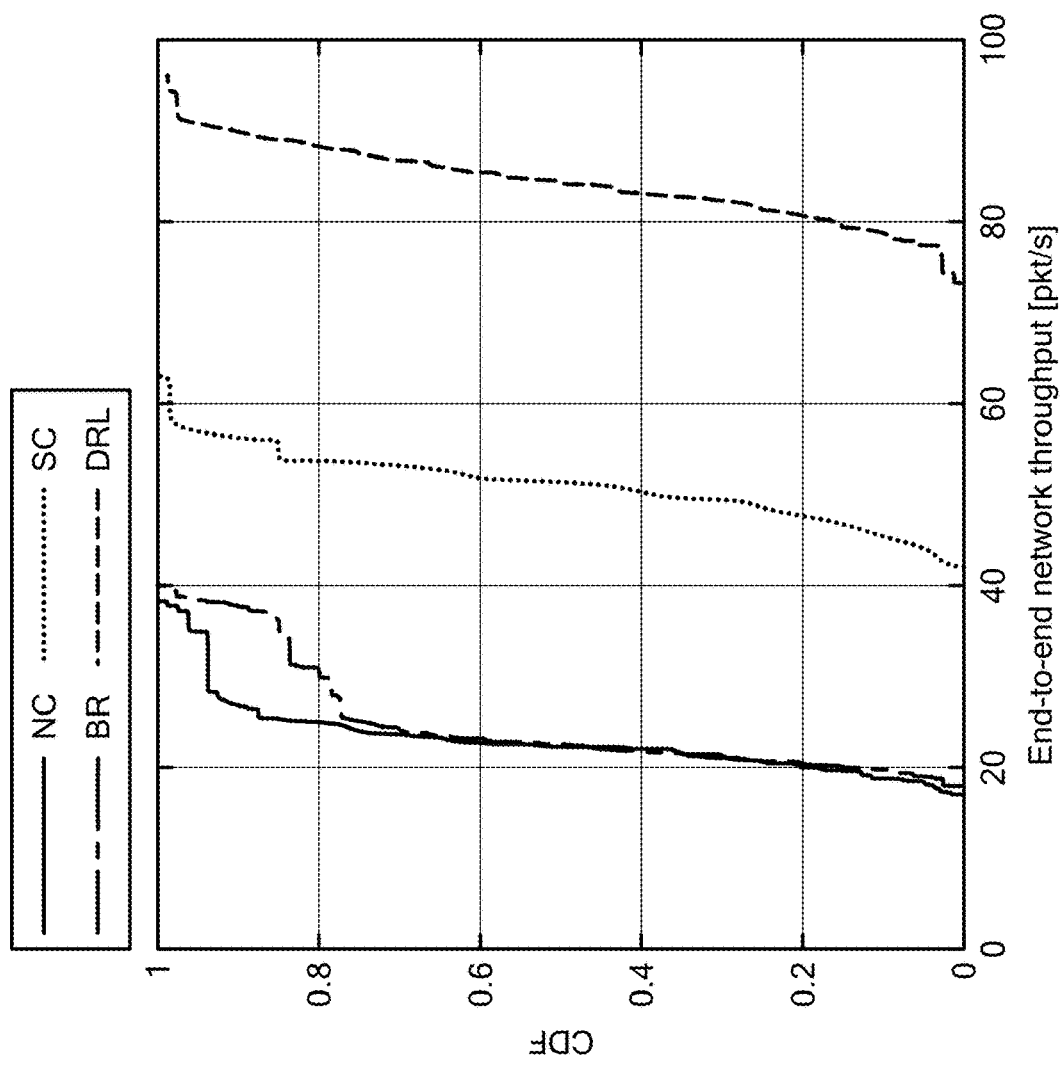
FIG. 15A is a graph of cumulative distribution function of measured end-to-end network throughput for different control schemes, including convex optimization-based control schemes (SC), over 100 experiments on an 8-UAV network.

An evaluation is provided of a performance comparison between the convex optimization-based control approach and the data-driven control approach provided herein. Specifically, the performance was compared of the two control solutions on Scenario 6, which involves 8 UAVs, two sensing areas, and two reporting areas. The controls are again UAVs' locations and TX power. For both schemes, the same experimental configuration was considered. As shown in FIGS. 15A-15B, the data-driven optimization control scheme (DRL) outperformed the convex optimization-based control schemes (SC), achieving 1.7× better performance. The reason behind this performance gap is that the performance of the model-based optimization is tightly coupled to the accuracy of the models employed in the problem formulation and to the quality of the approximation and relaxation necessary to solve the UAV network control problem via convex optimization. On complex UAV networks, which require a conspicuous modeling and approximation effort, these effects combined can result in sub-optimal solutions that result in a performance gap between modeling and performance assessment. On the contrary, the performance of the data-driven optimization provided herein is driven by the performance data itself. In conclusion, data-driven solutions such as the one provided herein have the potential to bridge the gap between UAV network control and network performance optimization.

Figure 16B:
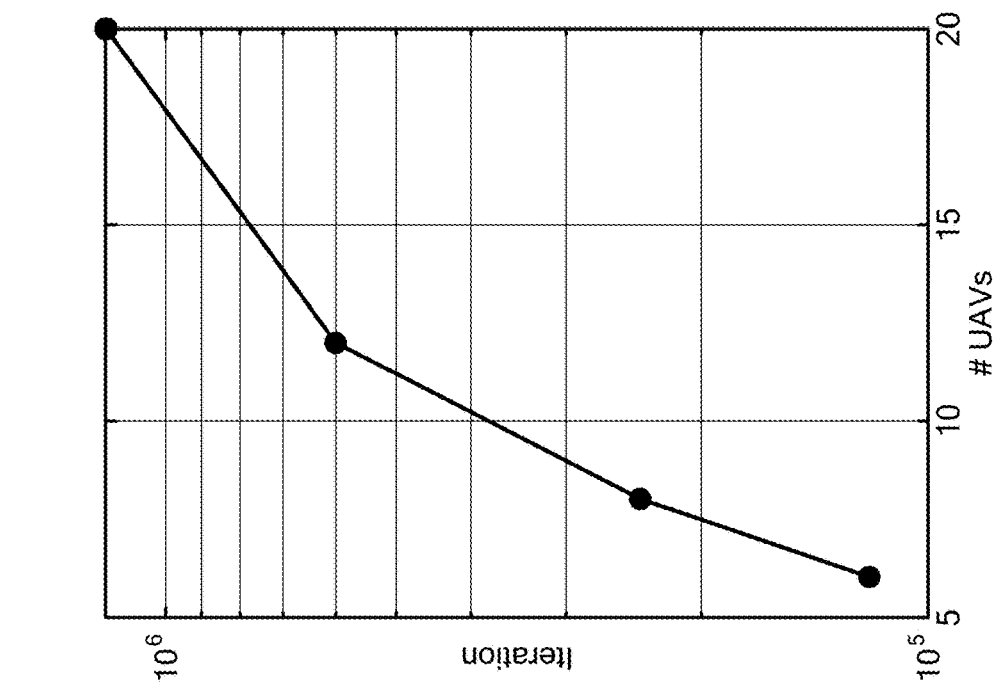
FIG. 16B illustrates a number of training iterations used to train DRL agents for different UAV network sizes.
Figure 16A:
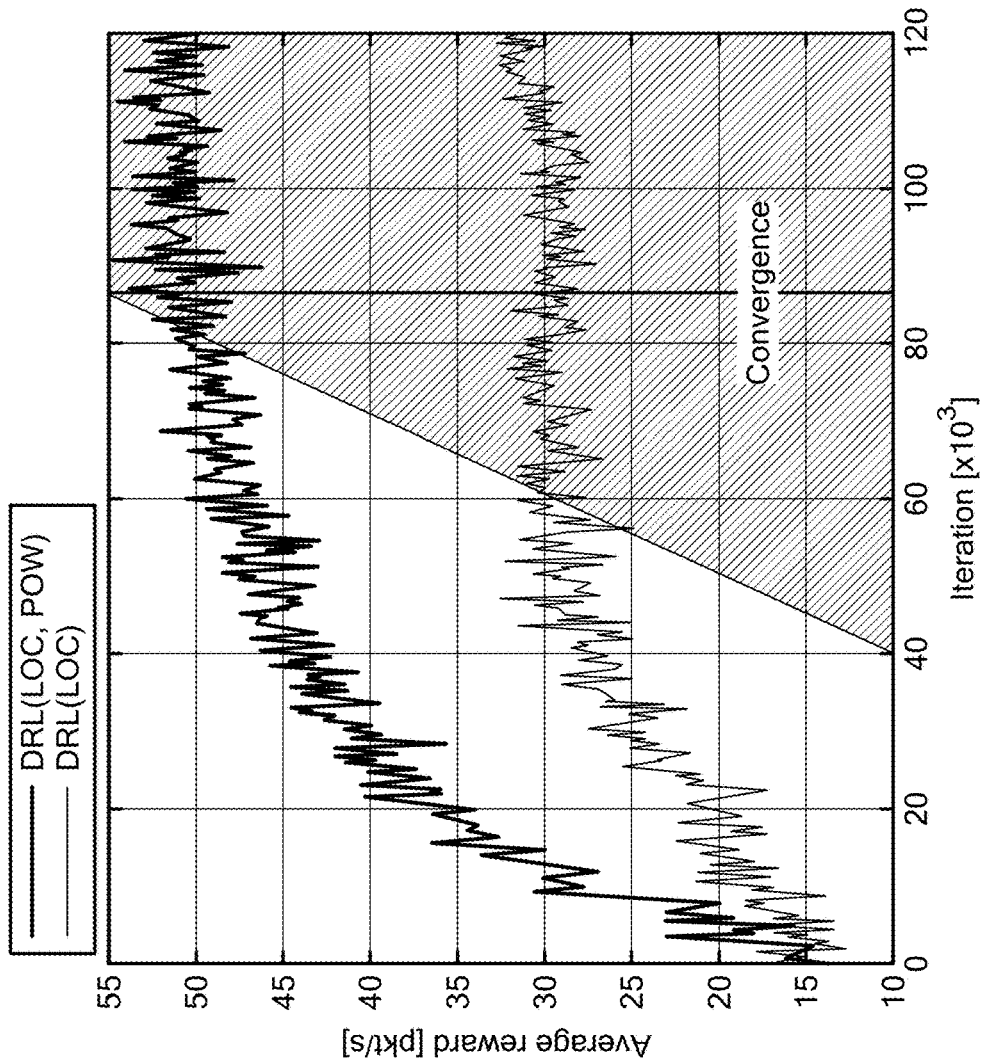
FIG. 16A illustrates average reward versus training iterations for the 6-UAV network illustrated in FIG. 8A.

The complexity of the data-driven control approach is reported in FIGS. 16A-16B. FIG. 16A illustrates the reward function trend over the training iterations for the two DRL control schemes and the 6 UAV network discussed in Sec 5.1. When the DRL agents can only control the UAV's location, they require a fewer number of training iterations to reach convergence, that is when the reward function cannot be further improved and the system can be deemed 'trained'. The DRL agents require 60 k iterations to converge in this case, with respect to the 80 k iterations necessary when the agents add the UAV's transmission power to the range of their control parameters. However, it is important to notice that despite requiring a longer number of iterations to reach convergence, a wider range of control parameters corresponds to a higher reward, both at convergence and at every previous iteration. This trend suggests that augmenting the degrees of freedom of the DRL agents always results in improved performance. FIG. 16B reports the number of iterations required to deem the DRL agents 'trained' in the networks with 6, 8, 12, and 20 UAVs described earlier. As shown in the figure, the required number of iterations to reach convergence grows with the number of UAVs. This is motivated by the fact that the presence of more agents corresponds to a larger solution space to be explored in order to find the optimal network configuration. As mentioned above, each training iteration requires 5 seconds of emulated execution time to allow the agent to gather statistically relevant performance measurements. For these UAV networks, the simulation time required to reach training convergence is approximately 166, 332, 830, and 1660 hours, respectively. Even though such training times might be excessively long for experimental performance data collection, it was explained hereinabove in detail how to leverage parallelism in the virtual training environment to collect extensive performance data. Thanks to this feature of the virtual training environment, the total training time cost can be efficiently reduced by running multiple containers in parallel.

Advantages

Recent years have seen a surge in interest toward the integration of UAVs and the wireless infrastructure for a variety of applications such as 5G-and-beyond cellular networks, millimeter-wave and terahertz networks, Wi-Fi, and ad-hoc tactical networks, to name a few. In this context, AI-based control approaches are on the rise thanks to their effectiveness and applicability to motion-controllable UAV-based wireless nodes. For example, investigate the placement optimization of multiple UAV-based aerial base stations to maximize the coverage rate of ground users has been investigated. The latter also optimizes for the energy consumption of the UAVs' recharging and landing operations, while tailoring its RL approach to emergency response scenarios. DRL has been utilized for UAV-based BSs path planning so as to minimize the interference with ground infrastructure and optimize the BS-to-user latency.

Other works, instead, mainly focus on wireless networking operations optimization via machine learning. Machine learning and its flavors are employed to predict the data size of computing tasks for efficient UAV-based MEC; to combat adversarial attacks for cellular-connected UAVs; to optimize content caching on UAV-based BS; or a mix of those. Some works in the literature focus on the joint optimization of motion and wireless operations. Specifically, DRL is used to optimize the trajectory and the power control for UAV-assisted service networks. A DRL technique has been described to optimize UAVs' trajectory and time resource allocation in UAV wireless powered IoT networks.

Different from the above works, which mainly rely on an abstraction of the underlying communication infrastructure and limit their contribution to a mix of analytical results and simulation, the two-tier architecture provided herein provides the communication infrastructure and the architectural innovations to design and implement data-driven control and optimization for real UAV network fieldings. The technology extends the Drone Programmable Protocol Stack with data-driven functionalities (DRL DPPS). The DRL DPPS is integrated into a new full-fledged emulation environment for UAV networks that are systematically employed to train and assess the performance of the DRL-based solution provided herein with a high degree of realism.

Features of the Described Technology

The technology described herein provides a two-tier architecture to control and optimize UAV networks based on Deep-reinforcement learning (DRL). The described architecture features a 'ready-to-fly' virtual environment that integrates fully reconfigurable wireless protocol stacks for software-defined UAVs with the CORE/EMANE emulation tools. The 'ready-to-fly' virtual environment allows the collection of extensive high-fidelity UAV network performance data without the burden of carrying out time- and energy-consuming flight experiments thus simplifying the modeling and training procedures for data-driven control solutions. The system can be employed to model different UAV network control problems as multi-agent DRL problems, collect extensive performance data, and use the data collected to train a set of DRL agents for mission-specific goals. The DRL architecture implements distributed data-driven optimization (with up to 3.7× throughput gains and 0.2× latency reduction if compared to other approaches), facilitates network reconfigurability, and provides a scalable solution for large UAV networks (up to 20 nodes or more).

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A system for controlling a network of distributed non-terrestrial nodes comprising:
   a control framework, comprising one or more processors and memory, operative to train and control a plurality of the non-terrestrial nodes, the control framework comprising:
      a control interface in communication with a network operator to receive one or more specified control objectives, and
      a learning engine operative to train a virtual non-terrestrial network;
   wherein the control framework is further operative to transfer knowledge gained through the training of the virtual non-terrestrial network to the network of distributed non-terrestrial nodes as data-driven logic unit configurations tailored for the specified control objectives.

2. The system of claim 1, wherein the non-terrestrial nodes are operative to execute the received data-driven logic unit configurations on-board based on local state information.

3. The system of claim 1, wherein the non-terrestrial nodes are operative to communicate with each other to exchange local information for facilitating the execution of the received data-driven logic unit configurations.

4. The system of claim 1, wherein the virtual non-terrestrial network includes a number of virtual non-terrestrial nodes each corresponding to one or more of the non-terrestrial nodes.

5. The system of claim 4, wherein each of the virtual non-terrestrial nodes, when trained, corresponds to one or more of the data-driven logic unit configurations.

6. The system of claim 1, wherein each of the data-driven logic unit configurations corresponds to one or more of the non-terrestrial nodes.

7. The system of claim 6, wherein each of a plurality of the non-terrestrial nodes comprises an unmanned aerial vehicle (UAV) including:
   a radio front-end operative for electronic communication with at least one other of the non-terrestrial nodes;
   a motion front-end operative to control a motion of the UAV; and
   a drone programmable protocol stack (DPPS) having a data-driven logic unit for operating the UAV.

8. The system of claim 7, wherein the data-driven logic unit of the DPPS includes a neural network and the data-driven logic unit is a neural network configuration.

9. The system of claim 8, wherein the neural network is at least one of a deep learning neural network, a reinforcement learning neural network, or a deep reinforcement learning neural network.

10. The system of claim 9, wherein the neural network is a deep reinforcement learning neural network and the DPPS is a drone programmable protocol Stack (DRL DPPS).

11. The system of claim 10, wherein the DRL DPPS of each UAV includes a DRL plane operative to execute a deep reinforcement learning neural network according to the corresponding neural network configuration using inputs corresponding to one or more current motion and network conditions of at least a portion of the network of distributed non-terrestrial nodes to determine motion and networking policies.

12. The system of claim 11, wherein the DRL DPPS of each UAV includes a data plane operative to:
reconfigure motion control and networking stack parameters of the UAV responsive to the determined motion and networking policies; and
determine the current motion and network conditions of the at least a portion of the network of distributed non-terrestrial nodes.

13. The system of claim 12, wherein each UAV includes a register plane operative to:
store the motion and networking policies determined by the DRL plane in one or more policy lookup tables; and
store the current motion and network conditions determined by the data plane in one or more network state lookup tables.

14. The system of claim 13, wherein the DRL plane is further operative to retrieve the current motion and network conditions from the one or more network state lookup tables of the register plane.

15. The system of claim 13, wherein the data plane is operative to retrieve the motion and networking policies from the one or more policy lookup tables.

16. The system of claim 13, wherein the data plane includes a plurality of operative layers, each of the operative layers corresponding to a networking or motion functionality.

17. The system of claim 16, wherein the plurality of operative layers includes at least two of a motion layer, a physical layer, a MAC layer, a network layer, a transport layer, and an application layer.

18. The system of claim 17, further comprising a driver plane including:
a flight control firmware operative to receive motion control information from the motion layer of the data plane and to operate the motion front-end in accordance with the motion control information; and
a software-defined radio operative to receive physical control information from the physical layer of the data plane and to operate the radio front-end in accordance with the physical control information.

19. The system of claim 16, wherein the register plane includes at least one network state lookup table corresponding to each of the operative layers.

20. The system of claim 16, wherein the register plane includes at least one policy lookup table corresponding to each of the operative layers.

21. The system of claim 10, wherein the learning engine further comprises:
a virtual training environment operative to generate and train a corresponding one of the virtual non-terrestrial nodes for each of the UAVs, each of the corresponding virtual non-terrestrial nodes including a virtual UAV having a DRL DPPS;
a virtual testing environment operative to test the trained virtual UAVs; and
a virtual emulation environment operative to emulate at least a motion layer and a physical layer of the DRL DPPS within the virtual training environment and the virtual testing environment.

22. The system of claim 21, wherein the virtual emulation environment is in communication with a MAC layer of a data plane of the DRL DPPS of the virtual non-terrestrial node, one or more policy lookup tables of a register plane of the DRL DPPS of the virtual non-terrestrial node, and one or more network state lookup tables of the register plane of the DRL DPPS of the virtual non-terrestrial node.

23. The system of claim 21, wherein the virtual emulation environment includes a common open research emulator (CORE) integrated with an extendable mobile ad-hoc network emulator (EMANE).

* * * * *